US012808669B2

(12) United States Patent
Okimoto

(10) Patent No.: US 12,808,669 B2
(45) Date of Patent: Nov. 24, 2026

(54) VIBRATING GYRO ELEMENT AND GYROSCOPE

(71) Applicant: Sumitomo Precision Products Co., Ltd., Amagasaki (JP)

(72) Inventor: Naoki Okimoto, Amagasaki (JP)

(73) Assignee: Sumitomo Precision Products Co., Ltd., Amagasaki (JP)

( * ) Notice: Subject to any disclaimer, the term of this patent is extended or adjusted under 35 U.S.C. 154(b) by 261 days.

(21) Appl. No.: 18/845,515

(22) PCT Filed: Jan. 19, 2023

(86) PCT No.: PCT/JP2023/001492

§ 371 (c)(1),
(2) Date: Sep. 10, 2024

(87) PCT Pub. No.: WO2023/171145

PCT Pub. Date: Sep. 14, 2023

(65) Prior Publication Data

US 2025/0180355 A1 Jun. 5, 2025

(30) Foreign Application Priority Data

Mar. 11, 2022 (JP) ................................ 2022-038066

(51) Int. Cl.
*G01C 19/5684* (2012.01)
*G01C 19/5712* (2012.01)

(52) U.S. Cl.
CPC ................................ *G01C 19/5712* (2013.01)

(58) Field of Classification Search
CPC .................... G01C 19/00; G01C 19/56; G01C 19/567–5684; G01C 19/5712
See application file for complete search history.

(56) References Cited

U.S. PATENT DOCUMENTS 6,698,271 B1 * 3/2004 Fell ...................... G01C 19/567 73/1.37
9,157,739 B1 * 10/2015 Beitia ................ G01C 19/5677
(Continued)

FOREIGN PATENT DOCUMENTS

CA 3183334 A1 1/2022
GB 2567479 A * 4/2019 ......... G01C 19/5677
JP 2009-115559 A 5/2009

OTHER PUBLICATIONS

International Search Report (PCT/ISA/210) issued in PCT Application No. PCT/JP2023/001492 dated Apr. 4, 2023 with English translation (5 pages).
(Continued)

*Primary Examiner* — Nguyen Q. Ha
(74) *Attorney, Agent, or Firm* — Crowell & Moring LLP

(57) ABSTRACT

A vibrating gyro element (100) according to this invention includes electrodes (40) including a primary drive electrode (PD), a primary detection electrode (PPO), and a secondary detection electrode (SPO), and a secondary drive electrode (SD). Electrical connection in each of the primary drive electrode, the primary detection electrode, the secondary detection electrode and the secondary drive electrode is set to make, with respect to a position and a direction of a current of the electrode of interest to be switched as reference, potential differences between the electrode of interest, and the electrodes that are arranged on a periphery of the electrode of interest unchanged before and after the switching.

7 Claims, 15 Drawing Sheets

(56) References Cited

U.S. PATENT DOCUMENTS

| | | | | |
|---|---|---|---|---|
| 9,482,553 | B2 * | 11/2016 | Weinberg | G01C 25/005 |
| 9,671,247 | B2 * | 6/2017 | Okon | G01C 25/00 |
| 10,670,400 | B2 * | 6/2020 | Townsend | G01C 19/5684 |
| 2015/0285658 | A1 * | 10/2015 | Zotov | G01C 19/5776<br>73/497 |

OTHER PUBLICATIONS

Japanese-language Written Opinion (PCT/ISA/237) issued in PCT Application No. PCT/JP2023/001492 dated Apr. 4, 2023 with English translation (5 pages).

* cited by examiner

VIBRATING GYRO ELEMENT AND GYROSCOPE

TECHNICAL FIELD

The present invention relates to a vibrating gyro element and a gyroscope, in particular to a vibrating gyro element including a vibrator and electrodes, and a gyroscope including the vibrating gyro element.

BACKGROUND ART

Gyroscopes including a vibrating gyro element including a vibrator and electrodes are known. Such a gyroscope is disclosed in Japanese Patent Laid-Open Publication No. JP 2009-115559, for example.

The above Japanese Patent Laid-Open Publication No. JP 2009-115559 discloses a gyroscope including a vibrating gyro element. The vibrating gyro element includes a ring-shaped element (vibrator) and electrodes. The electrodes are a plurality of electrodes spaced away at a predetermined angular interval in a peripheral direction about a center of the element. The plurality of electrodes include a primary drive electrode for generating primary vibration in the element, a primary detection electrode for detecting the primary vibration, a secondary detection electrode for detecting secondary vibration in the element, and a secondary drive electrode for counteracting the secondary vibration. The gyroscope calculates an angular velocity based on an alternating voltage applied to the secondary drive electrode to counteract the secondary vibration.

Also, in the known gyroscope as stated in the above Japanese Patent Laid-Open Publication No. JP 2009-115559, the angular velocity detected by the gyroscope includes a bias component. The bias component is also called zero point output or offset, and appears due to angular deviation between the plurality of electrodes arranged in the vibrating gyro element, and unevenness of a magnetic field applied in a case of an electromagnetically driven vibrating gyro element. To address this, in the gyroscope as stated in the above Japanese Patent Laid-Open Publication No. JP 2009-115559, the bias component is canceled by switching between the primary drive electrode and the secondary drive electrode, and between the primary detection electrode and the secondary detection electrode, and by subtracting one of output signals of the gyroscope before and after the switching from another.

PRIOR ART

Patent Document

Patent Document 1: Japanese Patent Laid-Open Publication No. JP 2009-115559

SUMMARY OF THE INVENTION

Problems to be Solved by the Invention

However, in the gyroscope stated as in the above Japanese Patent Laid-Open Publication No. JP 2009-115559, a bias component that cannot be canceled remains in some cases even when one of output signals of the gyroscope before and after the switching is subtracted from another. Specifically, in the gyroscope stated as in the above Japanese Patent Laid-Open Publication No. JP 2009-115559, a potential difference exists between an electrode that has a certain function and an electrode that is arranged on a periphery of the electrode, which has the certain function. In addition, since an alternating current flows through the electrodes, a displacement current corresponding to the potential difference is generated between the electrode that has the certain function and the periphery electrode. In such a case, a magnetic field is generated by the displacement current, and an effect (bias component) of the magnetic field caused by the displacement current is superimposed on the output signal. In the case in which the effect (bias component) of the magnetic field caused by the displacement current is superimposed on the output signal is superimposed on the output signal, since potential differences between the electrode that has the certain function and the periphery electrode before and after the switching become different for each other, the effect (bias component) of the magnetic field caused by the displacement current is not canceled and remains even when one of output signals before and after the switching is subtracted from another. For this reason, it is desired to sufficiently cancel the effect of the magnetic field caused by the displacement current in the switching configuration.

The present invention is intended to solve the above problems, and one object of the present invention is to provide a vibrating gyro element and a gyroscope capable of sufficiently canceling an effect of a magnetic field caused by a displacement current in a switching configuration.

Means for Solving the Problems

In order to attain the aforementioned object, a vibrating gyro element according to a first aspect of the present invention is an electromagnetically driven vibrating gyro element including a stationary part; a vibrator; a support connecting the vibrator to the stationary part for supporting the vibrator to allow the vibrator to vibrate; a plurality of electrodes arranged on a surface of the vibrator to be spaced at an interval away from each other in a circumferential direction of the vibrator and to form a line(s); and a magnetic field applier for applying a magnetic field to the electrodes, wherein the vibrator has a vibration mode of cos $N\theta$ (where N is a natural number not smaller than 2), the electrodes include a primary drive electrode for exciting the vibrator to primary vibration, a primary detection electrode for detecting the primary vibration, a secondary detection electrode for detecting secondary vibration of the vibrator, and a secondary drive electrode for driving the vibrator to counteract the secondary vibration, the primary drive electrode is configured to be able to switch with one of the secondary drive electrode and the secondary detection electrode, and the primary detection electrode is configured to be able to switch with another of the secondary drive electrode and the secondary detection electrode, and electrical connection in each of the primary drive electrode, the primary detection electrode, the secondary detection electrode and the secondary drive electrode is set to make, with respect to a position and a direction of a current of the electrode of interest to be switched as reference, potential differences between the electrode of interest, and the electrodes that are arranged on a periphery of the electrode of interest unchanged before and after the switching.

In the vibrating gyro element according to the first aspect of the present invention, as discussed above, electrical connection in each of the primary drive electrode, the primary detection electrode, the secondary detection electrode and the secondary drive electrode is set to make, with respect to a position and a direction of a current of the electrode of interest to be switched as reference, potential differences between the electrode of interest, and the electrodes that are arranged on a periphery of the electrode of interest unchanged before and after the switching. Accordingly, since potential differences between the electrode that has the certain function and the periphery electrode before and after the switching can be equal to each other, an effect of a magnetic field caused by a displacement current can be equally superimposed on each of output signals before and after the switching. As a result, for example, in a case in which one of the output signals before and after the switching is subtracted from another, the effect (bias component) of the magnetic field caused by the displacement current can be sufficiently canceled (zero or close to zero). In other words, it is possible to sufficiently cancel the effect (bias component) of the magnetic field caused by the displacement current in a switching configuration. In addition, since the effect of the magnetic field (bias component) caused by the displacement current can be sufficiently canceled, it is possible to improve detection accuracy of an angular velocity in a gyroscope including the vibrating gyro element.

In the vibrating gyro element according to the first aspect of the present invention, it is preferable that the electrical connection in each of the primary drive electrode, the primary detection electrode, the secondary detection electrode and the secondary drive electrode is set to satisfy conditions, with respect to the position and the direction of the current of the electrode of interest to be switched as the reference, that the positions and functions of the periphery electrodes, which are arranged on the periphery of the electrode of interest, before and after the switching are identical to each other, that the positions and the directions of currents of the periphery electrodes before and after the switching are identical to each other, and that the positions and orders of electrical connection in the functions of the periphery electrodes before and after the switching are identical to each other. According to this configuration, since potential differences between the electrode that has the certain function and the periphery electrode before and after the switching can be easily brought equal to each other, an effect (bias component) of a magnetic field caused by a displacement current can be easily sufficiently canceled.

In this configuration, it is preferable that the positions of the electrodes on the surface of the vibrator, the directions of the currents of the electrodes, and the orders of electrical connection in each of functions of the electrodes in the primary drive electrode, the primary detection electrode, the secondary detection electrode and the secondary drive electrode are set to make the positions of pairs of the electrodes that are set to switch with each other on the surface of the vibrator, the directions of currents of the pairs of the electrodes, which are set to switch with each other, and the orders of electrical connection in each of functions of the pairs of the electrodes, which are set to switch with each other, reflection symmetric with respect to an imaginary symmetry axis that passes through a center of the vibrator and extends in a radial direction of the vibrator. According to this configuration, it is possible to realize a configuration that brings potential differences between the electrode that has the certain function and the periphery electrode before and after the switching equal to each other without changing the directions of currents of the pairs of the electrodes, and the orders of electrical connection of each of the electrodes (i.e., without changing current paths of the functions) before and after the switching. As a result, a structure such as a switch for changing current paths of the functions is not required dissimilar to a configuration that brings potential differences between the electrode that has the certain function and the periphery electrode before and after the switching equal to each other by changing at least the directions of currents of the pairs of the electrodes or the orders of electrical connection of each of the electrodes (i.e., by changing current paths of the functions) before and after the switching. Consequently, it is possible to realize a structure that brings potential differences between the electrode that has the certain function and the periphery electrode before and after the switching equal to each other by using a simple structure.

In a configurations in which the imaginary symmetry axis is defined, it is preferable that a plurality of lines each of which includes the electrodes are arranged on the surface of the vibrator to extend side by side and to be spaced at an interval away from each other in the circumferential direction of the vibrator. According to this configuration, it is possible to easily arrange a plurality of lines of electrodes on the surface of the vibrator.

In this configuration, it is preferable that the primary drive electrode and one of the secondary detection electrode and the secondary drive electrode are alternately arranged in a common line; and that the primary detection electrodes and another of the secondary detection electrode and the secondary drive electrode are alternately arranged in a common line. According to this configuration, since pairs of the primary drive electrodes and the secondary detection electrodes or the secondary drive electrodes for switching with each other are arranged together in one line, and pairs of the primary detection electrodes and the secondary drive electrodes or the secondary detection electrodes for switching with each other are arranged together in another line, the electrodes as the primary drive electrode, the primary detection electrode, the secondary detection electrode and the secondary drive electrode can be arranged in balance. Also, since electrodes as the primary drive electrode, the primary detection electrode, the secondary detection electrode, and the secondary drive electrode are alternately arranged, it is possible to easily define the imaginary symmetry axis.

In the vibrating gyro element according to the first aspect of the present invention, it is preferable that the electrodes in each of functions of the primary drive electrode, the primary detection electrode, the secondary detection electrode, and the secondary drive electrode are electrically connected in a clockwise or counterclockwise order. According to this configuration, it is possible to simplify structures of wiring parts for electrical connection between the electrodes as each of the primary drive electrode, the primary detection electrode, the secondary detection electrode, and the secondary drive electrode.

In order to attain the aforementioned object, a gyroscope according to a second aspect of the present invention includes an electromagnetically driven vibrating gyro element; and a calculator for calculating an angular velocity based on an output signal from the vibrating gyro element, wherein the vibrating gyro element includes a stationary part; a vibrator; a support connecting the vibrator to the stationary part for supporting the vibrator to allow the vibrator to vibrate; a plurality of electrodes arranged on a surface of the vibrator to be spaced at an interval away from each other in a circumferential direction of the vibrator and to form a line(s); and a magnetic field applier for applying a magnetic field to the electrodes, wherein the vibrator has a vibration mode of cos Nθ (where N is a natural number not smaller than 2), the electrodes include a primary drive electrode for exciting the vibrator to primary vibration, a primary detection electrode for detecting the primary vibration, a secondary detection electrode for detecting secondary vibration of the vibrator, and a secondary drive electrode for driving the vibrator to counteract the secondary vibration, the primary drive electrode is configured to be able to switch with one of the secondary drive electrode and the secondary detection electrode, and the primary detection electrode is configured to be able to switch with another of the secondary drive electrode and the secondary detection electrode, and electrical connection in each of the primary drive electrode, the primary detection electrode, the secondary detection electrode and the secondary drive electrode is set to make, with respect to a position and a direction of a current of the electrode of interest to be switched as reference, potential differences between the electrode of interest, and the electrodes that are a on a periphery of the electrode of interest unchanged before and after the switching.

In the gyroscope according to the second aspect of the present invention, as discussed above, electrical connection in each of the primary drive electrode, the primary detection electrode, the secondary detection electrode and the secondary drive electrode is set to make, with respect to a position and a direction of a current of the electrode of interest to be switched as reference, potential differences between the electrode of interest, and the electrodes that are arranged on a periphery of the electrode of interest unchanged before and after the switching. Accordingly, since potential differences between the electrode that has the certain function and the periphery electrode before and after the switching can be equal to each other, an effect of a magnetic field caused by a displacement current can be equally superimposed on each of output signals before and after the switching. As a result, for example, in a case in which one of the output signals before and after the switching is subtracted from another, the effect (bias component) of the magnetic field caused by the displacement current can be sufficiently canceled (zero or close to zero). In other words, it is possible to provide a gyroscope capable of sufficiently canceling the effect (bias component) of the magnetic field caused by the displacement current in a switching configuration. In addition, since the effect of the magnetic field (bias component) caused by the displacement current can be sufficiently canceled, it is possible to improve detection accuracy of an angular velocity in a gyroscope including the vibrating gyro element.

Effect of the Invention

According to the present invention, it is possible to sufficiently cancel an effect of a magnetic field caused by a displacement current in a switching configuration.

MODES FOR CARRYING OUT THE INVENTION

Embodiments according the present invention will be described with reference to the drawings.

First Embodiment (Configuration of Vibrating Gyro Element)

Figure 1:
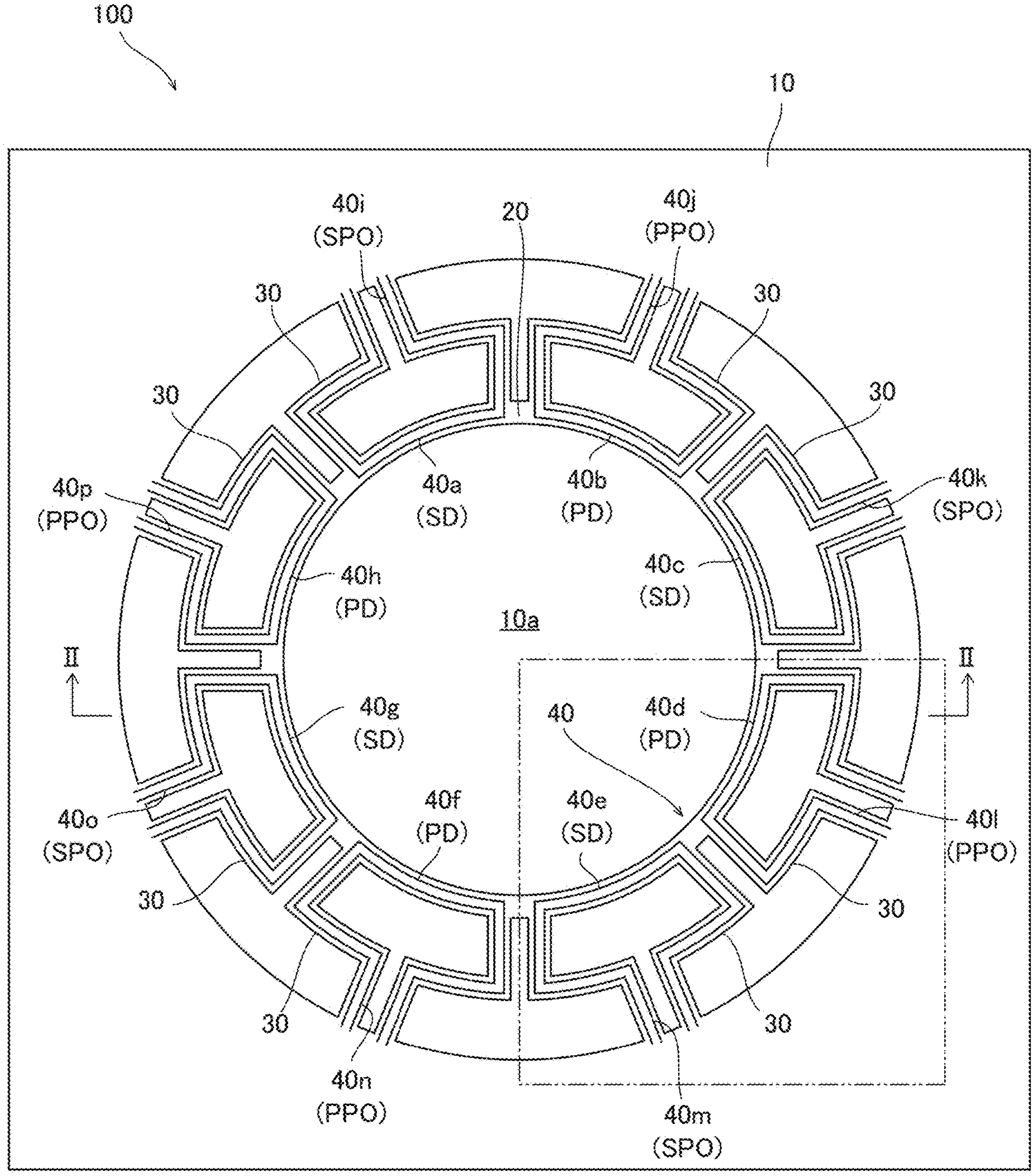
FIG. 1 is a plan view entirely showing a vibrating gyro element according to a first embodiment.
Figure 11:
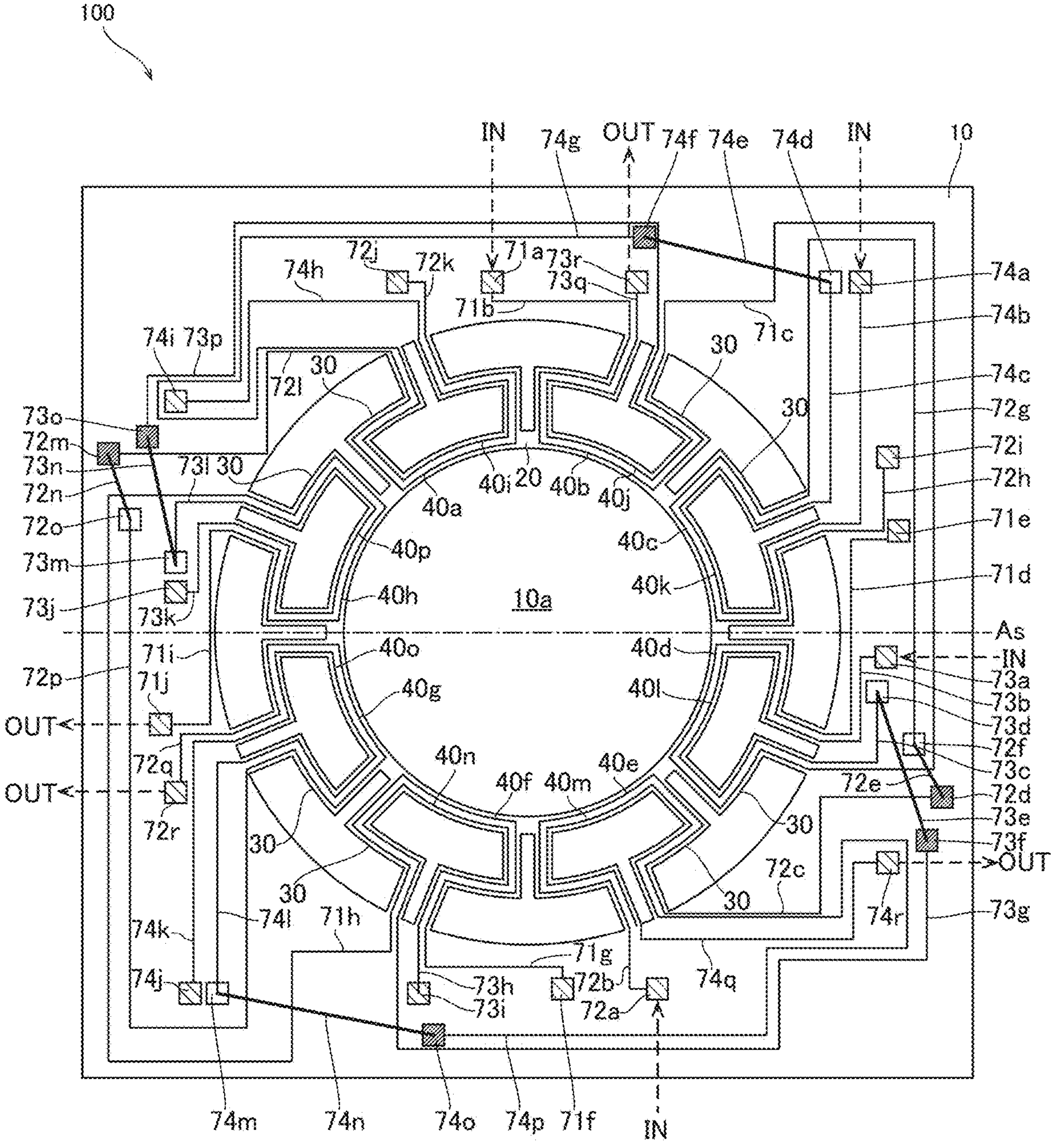
FIG. 11 is a plan view entirely illustrating electrical connection in the vibrating gyro element according to the first embodiment.

The following description describes a vibrating gyro element 100, and a gyroscope 101 including the vibrating gyro element 100 according to a first embodiment with reference to FIGS. 1 and 11.

In the following description, a radial direction of a vibrator 20 and an outer circumferential direction of the vibrator 20 are occasionally referred to as a radial direction and a circumferential direction, respectively, and a direction that intersects the radial direction and the circumferential direction is occasionally referred to as an axial direction. Also, a center side of the vibrator 20 in the radial direction is occasionally referred to as an inside or an interior side, and an outer periphery side is occasionally referred to as an outside or an exterior side. A side where an upper yoke 61 (see FIG. 2) in the axial direction is occasionally referred to as a top or a top side, and a side where a lower yoke 63 (see FIG. 2) is occasionally referred to as a bottom or a bottom side. Also, an upper surface and a lower surface of each element described later are occasionally referred to as a surface side and a back surface, respectively. Here, the radial direction is not necessarily required that its imaginary line extending from the radial direction intersects a center of the vibrator 20. Also, the circumferential direction is not necessarily limited to a curve having a fixed curvature.

Also, one or more primary drive electrodes are occasionally collectively referred to as a primary drive electrode PD, and one or more primary detection electrodes are occasionally collectively referred to as a primary detection electrode PPO. Also, one or more secondary drive electrodes are occasionally collectively referred to as a secondary drive electrode SD, and one or more secondary detection electrodes are occasionally collectively referred to as a secondary detection electrode SPO.

Figure 2:
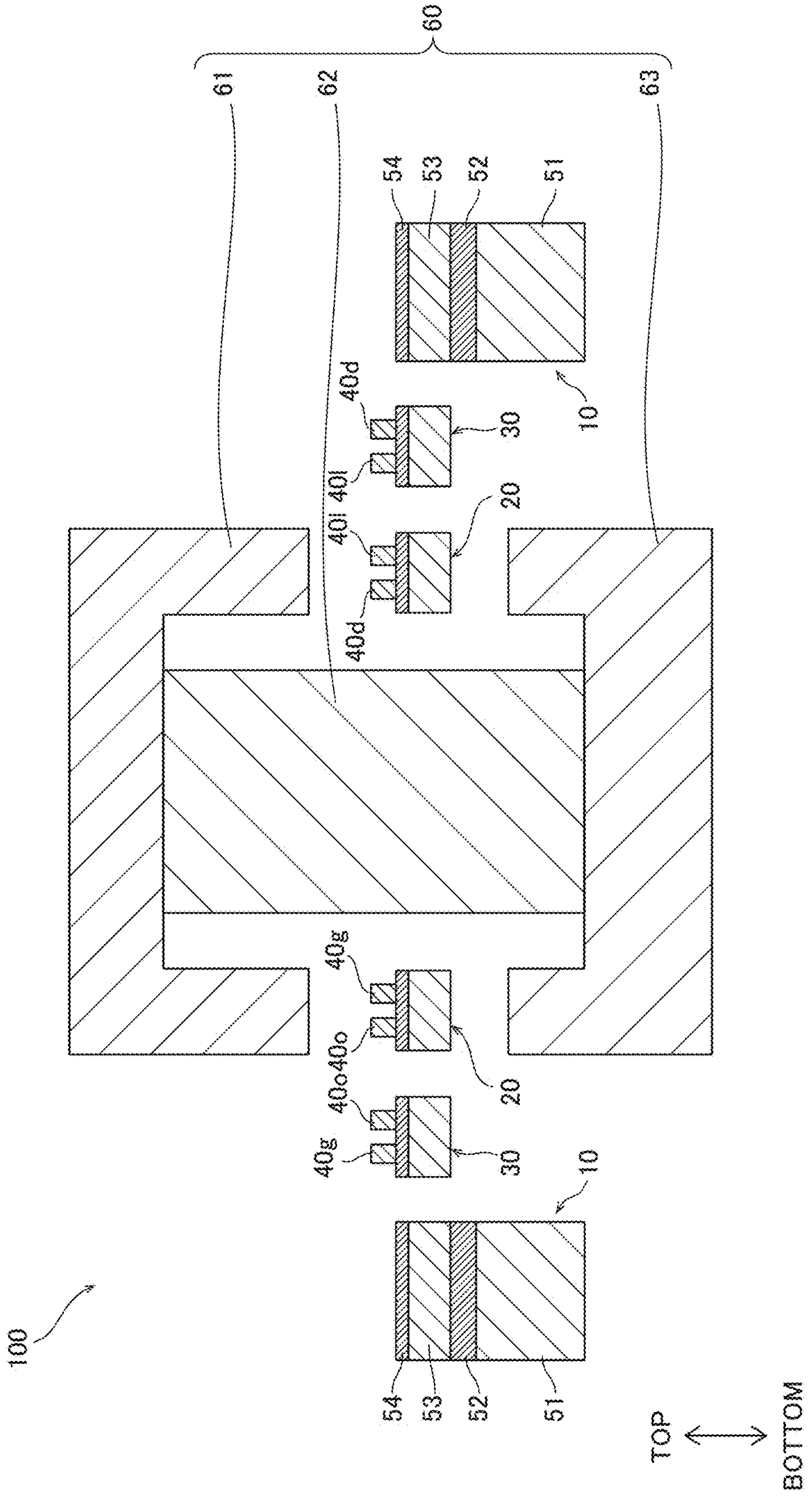
FIG. 2 is a cross-sectional view of the vibrating gyro element taken along a line II-II in FIG. 1.

As shown in FIGS. 1 and 2, the vibrating gyro element 100 includes a stationary part 10, the vibrator 20, a plurality of supports 30, a plurality of electrodes 40*a* to 40*p*, and a magnetic field applier 60. The vibrating gyro element 100 is an electromagnetic driven vibrating gyro element including the magnetic field applier 60.

As shown in FIG. 1, the stationary part 10 has an opening 10*a* in its central part. The vibrator 20, the plurality of supports 30, the plurality of electrodes 40*a* to 40*p*, and the magnetic field applier 60 (see FIG. 2) are arranged in the opening 10*a*. As shown in FIG. 2, the stationary part 10 is an element having a laminated structure in which a first silicon layer 51, a silicon oxide layer (insulating layer) 52, and a second silicon layer 53 are laminated on each other in this order. In addition, a silicon oxide film 54 is formed on a surface of the second silicon layer 53.

The vibrator 20 is a ring-shaped (circular) element constructed by processing the second silicon layer 53, and has a vibration mode of cos Nθ. In a case of the vibrator 20 of N=2 shown in FIG. 1, the primary vibration of a cos 2θ mode is excited.

The supports 30 are elements constructed by processing the second silicon layer 53, and are formed integrally with the vibrator 20. Also, the supports 30 connect the vibrator 20 to the stationary part 10, and support the vibrator 20 with the vibrator being cantilevered by each support. That is, the support 30 supports the vibrator 20 to allow the vibrator to vibrate.

Figure 3:
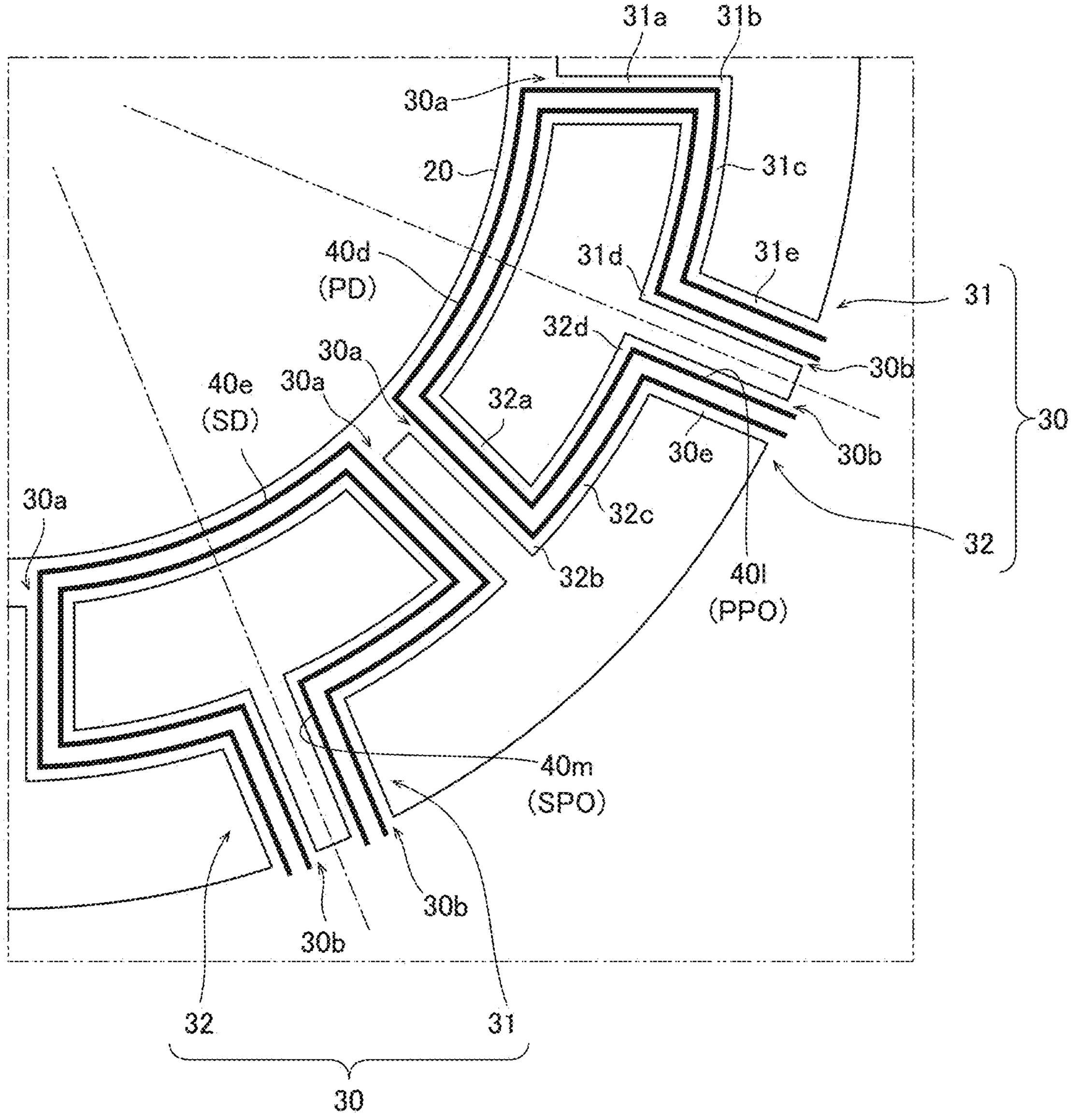
FIG. 3 is an enlarged view of a part enclosed by a dashed line in FIG. 1.

As shown in FIG. 3, each support 30 includes a first leg 31 and a second leg 32. Each of the first leg 31 and the second leg 32 has a first end 30*a* and a second end 30*b*. The first ends 30*a* (two first ends 30*a*) of the first leg 31 and the second leg 32 are connected to different positions of the vibrator 20 spaced at a first interval away from each other. The second ends 30*b* (two second ends 30*b*) of the first leg 31 and the second leg 32 are connected to different positions of the stationary part 10 spaced at a second interval smaller than the first interval away from each other.

Also, the first leg 31 includes a first part 31*a* extending toward the exterior side in the radial direction of the vibrator 20 from the first end 30*a*, and a second leg part 31*c* bent at a first bent part 31*b*, which is one end of the first part 31*a*, and extending parallel to an outer periphery of the vibrator 20. In addition, the first leg 31 includes a third part 31*e* bent at a second bent part 31*d*, which is one end of the second part 31*c*, and extending toward the exterior side in the radial direction of the vibrator 20 to reach the second end 30*b*.

Similarly, the second leg 32 includes a first part 32*a* extending toward the exterior side in the radial direction of the vibrator 20 from the first end 30*a*, and a second leg part 32*c* bent at a first bent part 32*b*, which is one end of the first part 32*a*, and extending parallel to the outer periphery of the vibrator 20. In addition, the second leg 32 includes a third part 32*e* bent at a second bent part 32*d*, which is one end of the second part 32*c*, and extending toward the exterior side in the radial direction of the vibrator 20 to reach the second end 30*b*.

The second part 31*c* of the first leg 31 and the second part 32*c* of the second leg 32 extend to the second bent parts 31*d* and 32*d*, respectively, so as to be closer to each other. Also, the third part 31*e* of the first leg 31 and the third part 32*e* of the second leg 32 extend side by side from the second bent parts 31*d* and 32*d*, respectively, to the second end 30*b* while being spaced at a predetermined interval away from each other. Also, the first leg 31 and the second leg 32 are arranged symmetrically with respect to an imaginary line passing through the center of the vibrator 20 and a center between their third parts 31*e* and 32*e*.

The electrodes 40*a* to 40*p* are electrically conductive elements formed in loops on a surface of the vibrator 20. The electrodes 40*a* to 40*p* are formed to extend over surfaces of the supports 30 and the stationary part 10. For example, as shown in FIG. 3, the electrode 40*d* extends from the second end 30*b* of the first leg 31 through the first leg 31, the vibrator 20 between the first ends 30*a* and the second leg 32 to the second end 30*b* of the second leg 32. Also, the electrode 40*d* is formed on a surface of the silicon oxide film 54. Hereinafter, in the following description, the electrodes 40*a* to 40*p* are occasionally collectively referred to as the electrode(s) 40 unless otherwise arrangements and functions of the electrodes are watched without particular interest.

The electrodes 40 are arranged on the surface of the vibrator 20 to be spaced at an interval away from each other in the circumferential direction of the vibrator 20 and to form lines. Also, the electrodes 40 in a plurality of lines (two lines in the first embodiment) are arranged on the surface of the vibrator 20 to extend side by side and to be spaced at an interval away from each other in the circumferential direction of the vibrator 20. The electrode 40 includes the primary drive electrode PD for exciting the vibrator 20 to the primary vibration of a cos 2θ mode, the primary detection electrode PPO for detecting the primary vibration, the secondary detection electrode SPO for detecting secondary vibration of the vibrator 20, and the secondary drive electrode SD for driving the vibrator 20 to counteract the secondary vibration. Lines of a plurality of electrodes 40 as at least one line (two lines in the first embodiment) formed in the circumference direction of the vibrator 20 on the surface of the vibrator 20 include one or more (four in the first embodiment) primary drive electrodes PD, one or more (four in the first embodiment) primary detection electrodes PPO, one or more (four in the first embodiment) secondary detection electrodes SPO, and one or more (four in the first embodiment) secondary drive electrodes SD.

As shown in FIGS. 1 and 3, two electrodes 40 are formed to extend side by side and to be spaced at an interval away from each other on surfaces of the support 30 and the vibrator 20. For example, as shown in FIG. 3, two electrodes 40*d* and 40*l* are formed to extend side by side and to be spaced at an interval away from each other on the surfaces of the support 30 and the vibrator 20. Here, in this specification, the term "side by side" is not limited to an arrangement of two elements arranged parallel to each other but includes an arrangement of two elements spaced at a certain degree of interval away from each other not to contact each other and not to intersect each other.

In FIG. 3, in the two electrodes 40*d* and 40*l* arranged on the surface of one support 30 and extending side by side in loops, the electrode 40*d* on the exterior side is the primary drive electrode PD, and the electrode 40*l* arranged on the interior side is the primary detection electrode PPO. Also, in the two electrodes 40*e* and 40*m* arranged on the surface of another support 30 and extending side by side in loops, the electrode 40*e* on the exterior side is the secondary drive electrode SD, and the electrode 40*m* arranged on the interior side is the secondary detection electrode SPO. In other words, the primary drive electrode PD and the primary detection electrode PPO are aligned in one common bearing angle, and the secondary drive electrode SD and the secondary detection electrode SPO are aligned in another common bearing angle.

As shown in FIG. 1, the primary drive electrodes PD and the secondary drive electrodes SD are alternately arranged in one common line, and the primary detection electrodes PPO and the secondary detection electrodes SPO are alternately arranged in another common line. In other words, pairs of the primary drive electrodes PD and the primary detection electrodes PPO, and pairs of the secondary drive electrodes SD and the secondary detection electrodes SPO are arranged alternately in the circumference direction. Also, the number of pairs of the primary drive electrodes PD and the primary detection electrodes PPO is the same as the number of pairs of the secondary drive electrodes SD and the secondary detection electrodes SPO.

One pair of the primary drive electrode PD and the primary detection electrode PPO, and another pair of the primary drive electrode PD and the primary detection electrode PPO that are closest to the one pair are arranged at 90 degrees away from each other. One pair of the secondary drive electrode SD and the secondary detection electrode SPO, and another pair of the secondary drive electrode SD and secondary detection electrode SPO that are closest to the one pair are arranged at 90 degrees away from each other. One pair of the primary drive electrode PD and the primary detection electrode PPO, and a pair of the secondary drive electrode SD and secondary detection electrode SPO that are closest to the one pair are arranged at 45 degrees away from each other. Four primary drive electrodes PD, four primary detection electrodes PPO, four secondary drive electrodes SD, and four secondary detection electrodes SPO are provided.

The four primary drive electrodes PD are electrically connected in series to each other through an electrode pad. Also, the four primary detection electrodes PPO are electrically connected in series to each other through an electrode pad. Also, the four secondary drive electrodes SD are electrically connected in series to each other through an electrode pad. Also, the four secondary detection electrodes SPO are electrically connected in series to each other through an electrode pad.

As shown in FIG. 2, the magnetic field applier 60 includes the upper yoke 61, a magnet 62, and the lower yoke 63. The upper yoke 61 and the lower yoke 63 are cylindrical elements that have a closed end on one side and are formed of a magnetic material such as iron. The upper yoke 61 and the lower yoke 63 are arranged with opened sides of cylindrical parts of the upper yoke 61 and the lower yoke 63 face each other and are spaced at an interval in the axial direction away from each other. The vibrator 20 is arranged between the cylindrical part of the upper yoke 61 and the cylindrical part of the lower yoke 63. The vibrator 20 is arranged between the cylindrical part of the upper yoke 61 and the cylindrical part of the lower yoke 63 to be spaced at an interval in the axial direction away from opened sides of cylindrical parts. Here, the magnetic field applier 60 is not illustrated in FIGS. 1 and 3.

The magnet 62 has an N pole on one of upper and lower sides, and an S pole on the another side of upper and lower sides. The magnet 62 is held by the upper yoke 61, the lower yoke 63, or both the upper and lower yokes, and is fixedly arranged on the interior side in the radial direction of the vibrator 20.

A magnetic flux flowing from one of the magnetic poles of the magnet 62 passes through one of the upper yoke 61 and the lower yoke 63 to reach the electrodes 40*a* to 40*p* formed on the vibrator 20 and the surface of the vibrator. In addition, the magnetic flux passes through the vibrator 20 and the electrodes 40*a* to 40*p*, and flows through another of the upper yoke 61 and the lower yoke 63 to another magnetic pole of the magnet 62.

Accordingly, the magnetic field applier 60 applies a magnetic field to the plurality of electrodes 40*a* to 40*p* in a direction intersecting the surface of the vibrator 20 (axial direction in this arrangement). The magnetic field applier 60 is supported by a support mount (not shown) so as to maintain radial and axial positions with respect the vibrator 20.

Except for the magnetic field applier 60, the vibrating gyro element 100 is a MEMS (Micro Electro Mechanical Systems) element obtained by processing a well-known SOI (Silicon on Insulator) substrate by using micromachining technology to which semiconductor microfabrication technology is applied.

For example, this MEMS element is obtained as follows. An SOI substrate including the first silicon layer 51, the silicon oxide layer 52 and the second silicon layer 53 is thermally oxidized to form a silicon oxide film 54 on the surface of the second silicon layer 53.

Subsequently, the plurality of electrodes 40*a* to 40*p* are formed on the surface of the silicon oxide film 54 by using a mask pattern (not shown). For example, a film of an electrically conductive material, such as aluminum, is attached to the surface of the silicon oxide film 54 by using the mask pattern to form the plurality of electrodes 40*a* to 40*p*.

the silicon oxide film 54 and the second silicon layer 53 are removed by using another mask pattern (not shown) by etching so that removed part reaches the silicon oxide layer 52. These processes forms base shapes of the supports 30 and the vibrator 20.

Subsequently, the first silicon layer 51 arranged under the supports 30 and the vibrator 20 is removed by using a mask pattern (not shown) corresponding to the opening 10*a* of the stationary part 10 by etching with the surfaces of the electrodes 40*a* to 40*p*, the supports 30 and the vibrator 20 being protected by wax, or the like. In addition, the silicon oxide layer 52 is removed by using the same mask pattern by etching to obtain the aforementioned MEMS element.

Here, the etching on the first silicon layer 51 and the silicon oxide layer 52 can be performed by dry etching or wet etching. However, in both etching types, it is preferable to use an etchant that has high etching selectivity between an etched layer and a layer under the etched layer.

(Configuration of Gyroscope)

Figure 4:
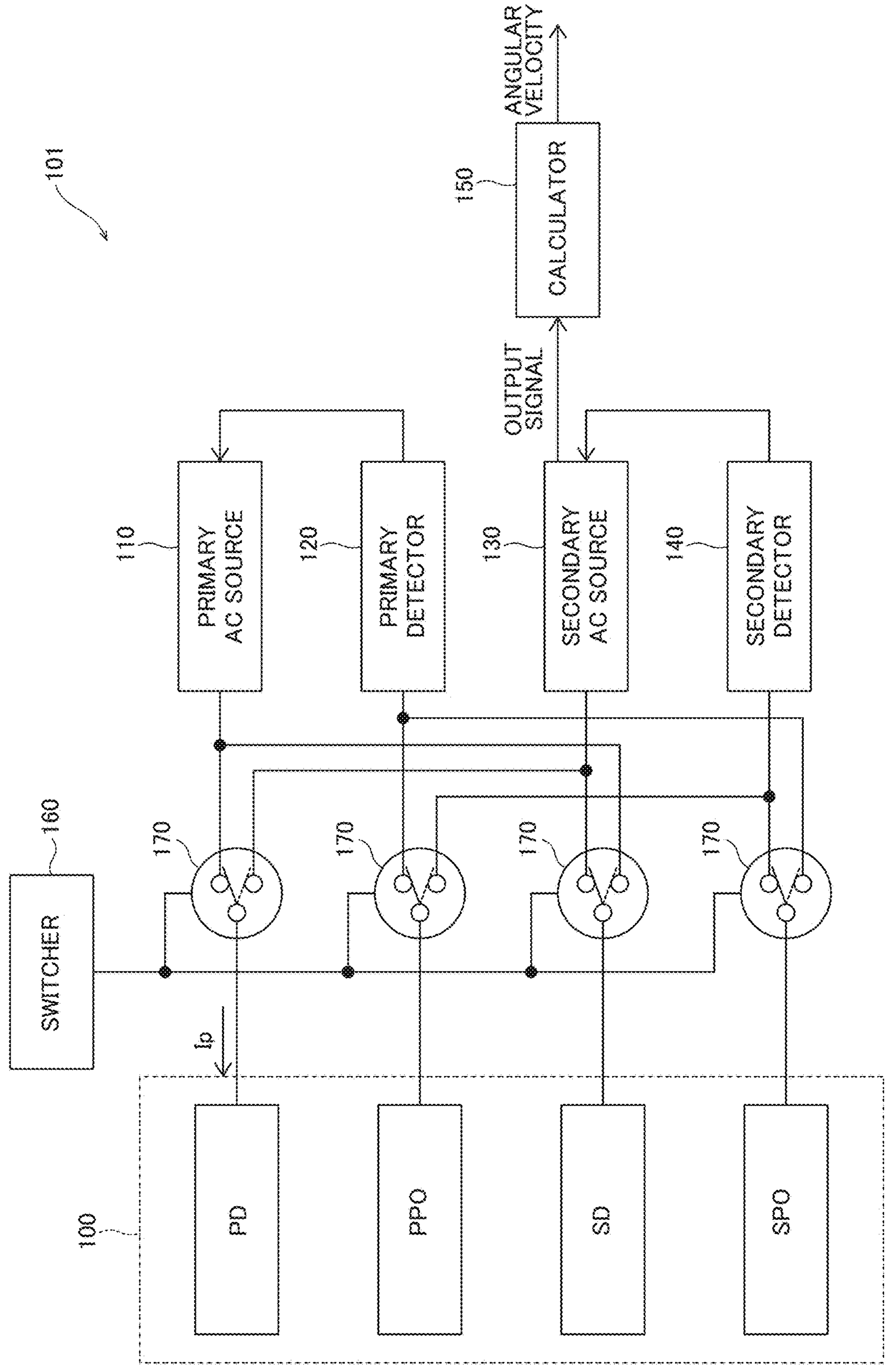
FIG. 4 is a block diagram showing a gyroscope according to the first embodiment.

The following description describes the gyroscope 101 including the vibrating gyro element 100 with reference to FIG. 4. Here, only the primary drive electrode PD, the primary detection electrode PPO, the secondary drive electrode SD, and the secondary detection electrode SPO are schematically shown in the vibrating gyro element 100 in FIG. 4 for ease of illustration.

As shown in FIG. 4, the gyroscope 101 includes the vibrating gyro element 100, a primary alternating current source 110, and a primary detector 120, a secondary alternating current source 130, a secondary detector 140, a calculator 150, a switcher 160, and a plurality of switches 170.

The primary alternating current source 110 is electrically connected to the four primary drive electrodes PD connected in series to each other. The primary detector 120 is electrically connected to the four primary detection electrodes PPO connected in series to each other. The secondary alternating current source 130 is electrically connected to the four secondary drive electrodes SD connected in series to each other. The secondary detector 140 is electrically connected to the four secondary detection electrodes SPO connected in series to each other. Also, the calculator 150 is electrically connected to the secondary alternating current source 130.

The following description describes the gyroscope 101.

When an alternating current Ip is supplied to the primary drive electrodes PD from the primary alternating current power source 110, Lorentz force is applied to the primary drive electrodes PD in a direction that intersects the magnetic field applied from the magnetic field applier 60 and a direction in which the alternating current Ip flows. That is, the Lorentz force acts in a direction parallel to the surface of the vibrator 20. The vibrator 20 on which the primary drive electrodes PD arranged is deformed by the Lorentz force. Also, since a direction of Lorentz force periodically reverses at a frequency of the alternating current Ip, the vibrator 20 vibrates at the same frequency. In this case, the vibrator 20 vibrates in a direction parallel to its surface.

The primary vibration of a cos 2θ mode is excited in the vibrator 20 by setting the frequency of the alternating current Ip to agree with a resonance frequency of the vibrator 20.

The alternating current Ip flows through each of the four primary drive electrodes PD to excite the vibrator 20 with the primary vibration of a cos 2θ mode. Specifically, the alternating current Ip flows through two primary drive electrodes PD that are arranged at 90 degrees away from each other in opposite directions, in other words, clockwise and counterclockwise as viewed from the top.

The primary detection electrodes PPO detect the primary vibration, and generate voltage signals in accordance with an amplitude of the primary vibration. The voltage signals are fed back to the primary detector 120. The primary detector 120 outputs an output signal to the primary alternating current source 110 based on the voltage signals generated by the primary detection electrodes PPO. The primary alternating current source 110 is controlled, specifically, an amplitude and a frequency of the alternating current Ip is controlled to keep the vibration frequency and the amplitude of the vibrator 20 constant based on the output signal of the primary detector 120.

Figure 5:
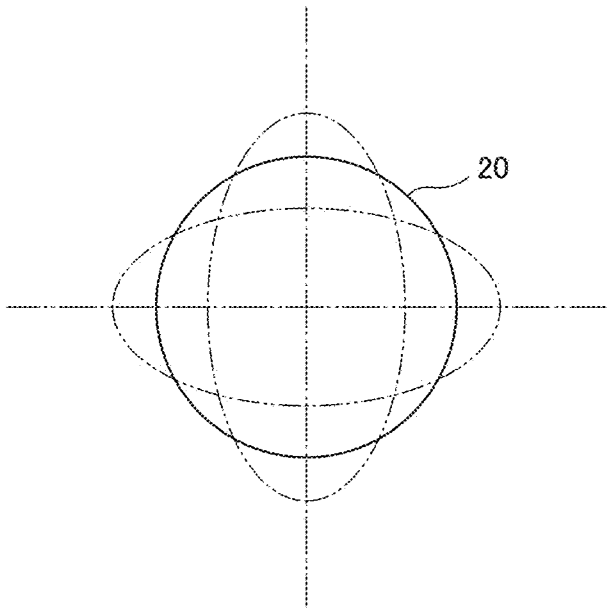
FIG. 5 is a view showing primary vibration in a vibrator according to the first embodiment.
Figure 6:
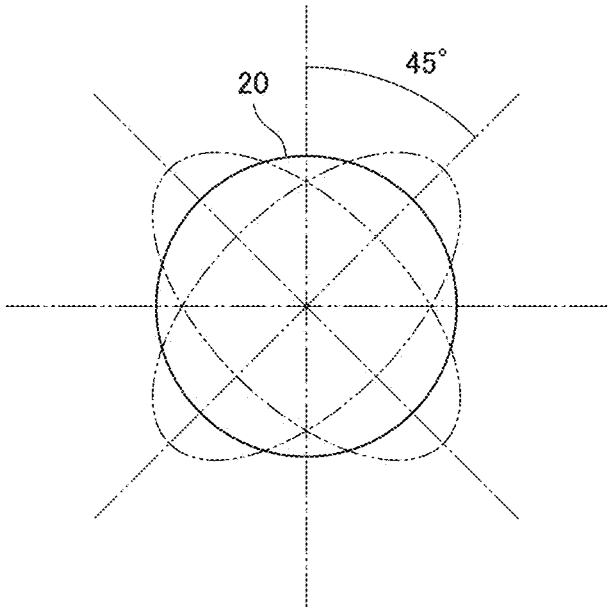
FIG. 6 is a view showing secondary vibration in the vibrator according to the first embodiment.

As shown in FIG. 5, the circular vibrator 20 produces primary vibration to periodically form elliptical shapes that have major axes perpendicular to each other. If Coriolis force is applied to the vibrator 20 so that angular velocity is generated about the axial direction, orientations of the major axes of the aforementioned elliptical shapes change. In the case of the vibrating gyro element 100 according this embodiment shown in FIG. 1, the major axes of the elliptical shapes change to orientations that are rotated by 45 degrees with respect to the primary vibration as shown in FIG. 6, and the vibrator 20 is brought in a secondary vibration state.

A magnetic field is also applied to the secondary detection electrodes SPO in a direction that intersects surfaces of the secondary detection electrodes. Also, the secondary detection electrodes SPO also vibrate in a direction parallel to surfaces of the secondary detection electrodes in accordance with the vibration of the vibrator 20. As a result, the secondary detection electrode SPO generates a sinusoidal alternating voltage in accordance with a strength of the magnetic field and a moving velocity in the vibration. Since the moving velocity of the secondary detection electrode SPO is different between a case of the vibrator 20 in a primary vibration state and a case of the vibrator in the secondary vibration state, voltages generated in both the states are correspondingly different.

The secondary detector 140 detects the voltages generated by the secondary detection electrode SPO, and outputs output signals in accordance with magnitudes of the voltages to the secondary alternating current source 130.

The output signals of the secondary detector 140 are input to the secondary alternating current source 130. The secondary alternating current source 130 drives the vibrator 20 by supplying an alternating current to the secondary drive electrodes SD based on the output signals to counteract the secondary vibration generated in the vibrator 20. In addition, an output signal is input to the calculator 150 based on the current output by the secondary alternating current source 130.

The calculator 150 determines whether the vibrator 20 is in the primary vibration state or the secondary vibration state based on the output signal of the secondary alternating current source 130. In addition, if it is determined that the vibrator 20 is in the secondary vibration state, the calculator 150 calculates the angular velocity based on the output signal of the secondary alternating current source 130.

Also, the vibrating gyro element 100 is configured to be able to switch between the primary drive electrode PD and the secondary drive electrode SD, and to switch between the primary detection electrode PPO and the secondary detection electrode SPO. The gyroscope 101 performs the switching at predetermined timing, acquires the output signals from the vibrating gyro element 100 before and after the switching, and calculates the angular velocity by using the calculator 150 based on the output signals. For example, the calculator 150 calculates the angular velocity based on the difference between the output signals before and after the switching. The switching is performed by switching internal connections by using the switches 170 and the switcher 160 shown in FIG. 4. Here, the "predetermined timing" is selected from a state in which the vibrating gyro element 100 is at rest, a state in which vibrating gyro element is at a constant velocity, and the like.

Figure 7:
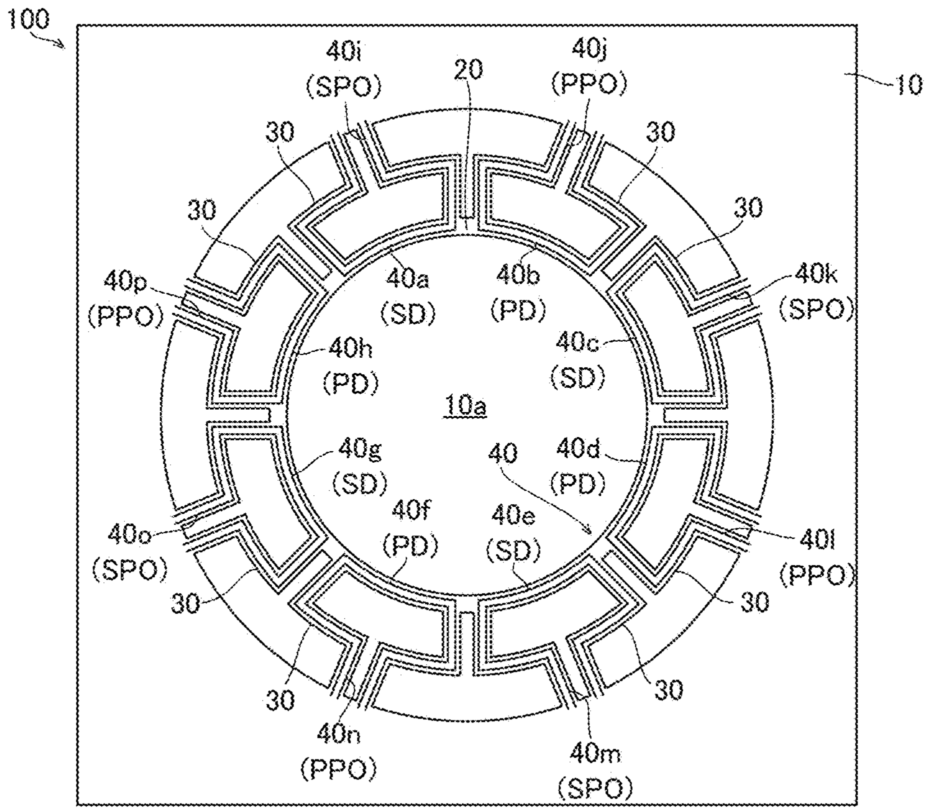
FIG. 7 is a plan view showing the vibrating gyro element before switching according to the first embodiment.

The electrode arrangement shown in FIG. 7 is an electrode arrangement before switching, and is the same as the electrode arrangement shown in FIG. 1. That is, the electrodes 40*b*, 40*d*, 40*f* and 40*h* are electrically connected to the primary alternating current source 110, and serve as the primary drive electrode PD. Also, the electrodes 40*j*, 40*l*, 40*n* and 40*p* are electrically connected to the primary detector 120, and serve as the primary detection electrode PPO. Also, the electrodes 40*a*, 40*c*, 40*e* and 40*g* are electrically connected to the secondary alternating current source 130, and serve as the secondary drive electrode SD. Also, the electrodes 40*i*, 40*k*, 40*m*, and 40*o* are electrically connected to the secondary detector 140, and serve as the secondary detection electrode SPO.

Figure 8:
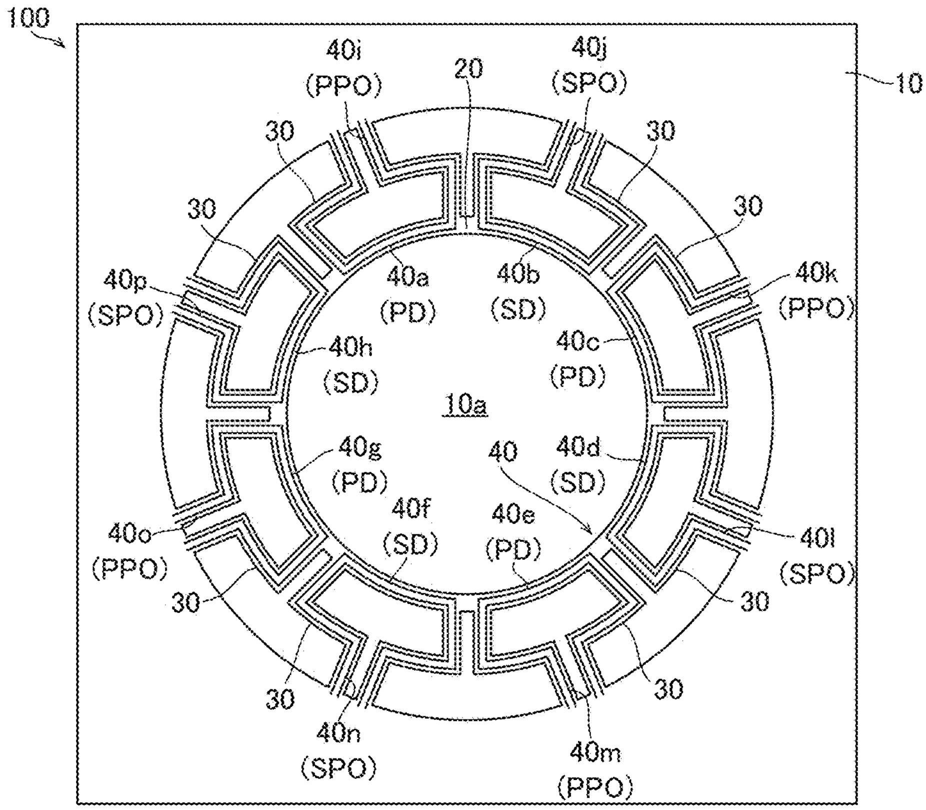
FIG. 8 is a plan view showing the vibrating gyro element after switching according to the first embodiment.

The internal wiring of the gyroscope 101 is switched by sending a control signal from the switcher 160 to the four switches 170 at the predetermined timing. As a result, the electrode arrangement is switched to an electrode arrangement after the switching shown in FIG. 8. Specifically, the electrodes 40*b*, 40*d*, 40*f* and 40*h* are electrically connected to the secondary alternating current source 130, and serve as the secondary drive electrode SD. Similarly, the electrodes 40*j*, 40*l*, 40*n* and 40*p* are electrically connected to the secondary detector 140, and serve as the secondary detection electrode SPO. The electrodes 40*a*, 40*c*, 40*e* and 40*g* are connected to the primary alternating current source 110, and serve as the primary drive electrode PD. The electrodes 40*i*, 40*k*, 40*m* and 40*o* are connected to the primary detector 120, and serve as the primary detection electrode PPO.

Here, the vibrating gyro element 100, the primary alternating current source 110, the primary detector 120, the secondary alternating current source 130, the secondary detector 140, and the calculator 150 can be mounted on separate boards, or can be mounted on a common board. The vibrating gyro element 100, the primary alternating current source 110, the primary detector 120, the secondary alternating current source 130, the secondary detector 140, and the calculator 150 may be included in separate packages (not shown). Also, the vibrating gyro element 100 and other components can be mounted on separate boards, or included in separate packages. In this case, the primary alternating current source 110 or the secondary alternating current source 130 can be mounted on another separate board, or included in another separate package.

(Electrical Connection of Electrodes)

Figure 9:
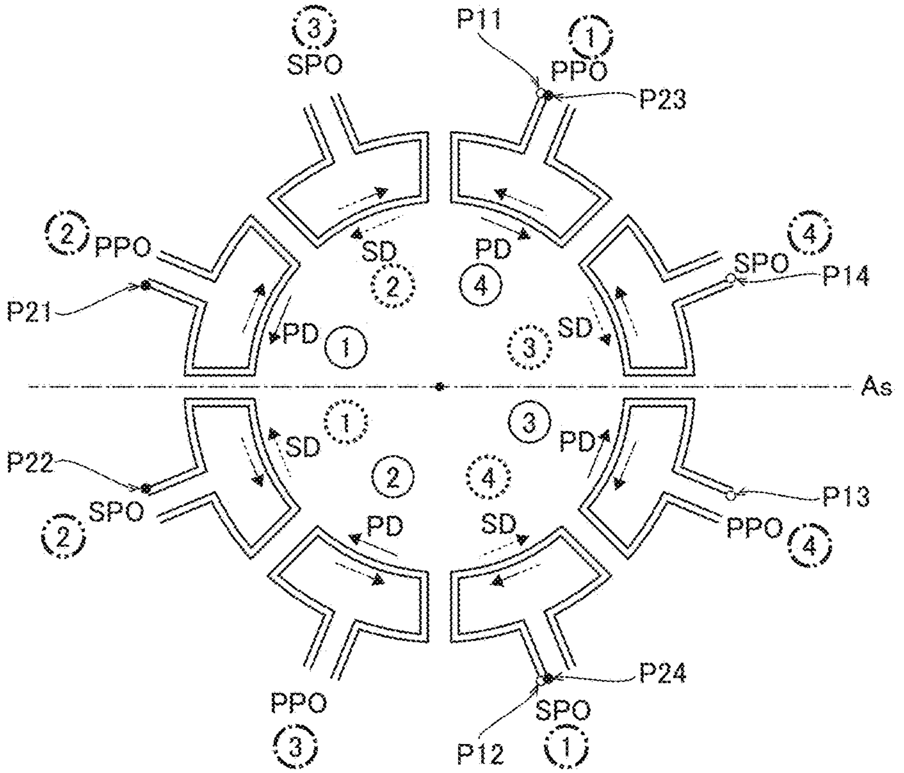
FIG. 9 is a plan view illustrating functions of electrodes, directions of currents, and orders of connection of the electrodes of the vibrating gyro element before the switching in the first embodiment.
Figure 10:
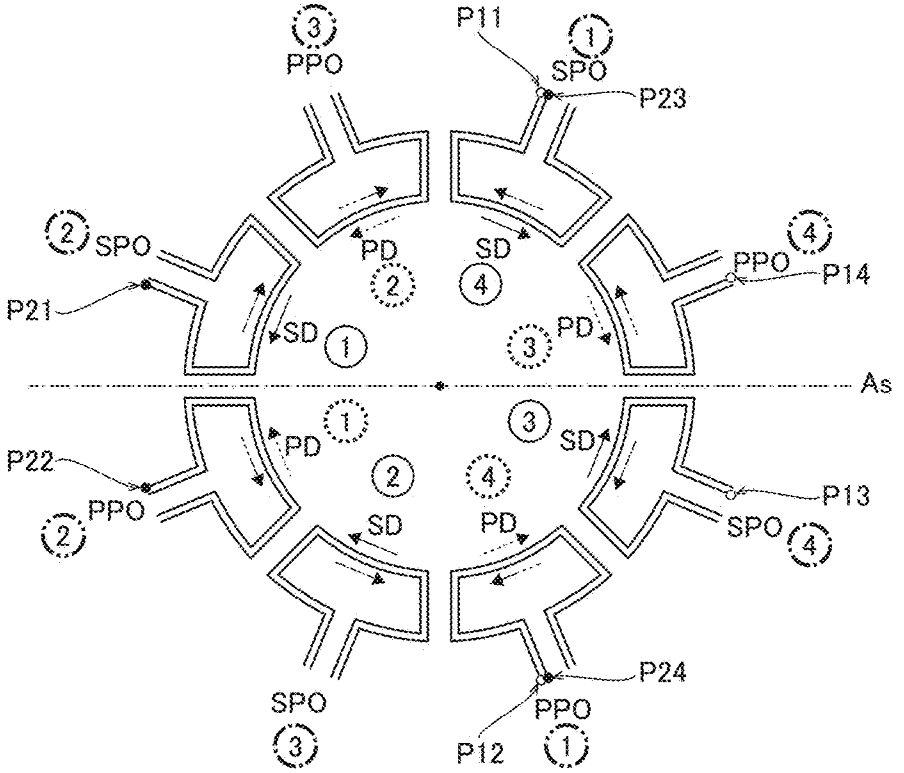
FIG. 10 is a plan view illustrating functions of the electrodes, directions of currents, and orders of connection of the electrodes of the vibrating gyro element after the switching in the first embodiment.

Here, in the first embodiment, as shown in FIGS. 9 and 10, electrical connection in the primary drive electrodes PD, the primary detection electrodes PPO, the secondary detection electrodes SPO, and the secondary drive electrodes SD is set to make, with respect to a reference position and a reference direction of the current of the electrode 40 of interest that is to be switched, a potential difference between the electrode of interest and the electrode 40 that is arranged on a periphery of the electrode of interest unchanged before and after the switching. Specifically, electrical connection in the primary drive electrode PD, the primary detection electrode PPO, the secondary detection electrode SPO and the secondary drive electrode SD is set to satisfy conditions, with respect to the reference position and the reference direction of the current of the electrode 40 of interest that is to be switched, that the positions and functions (roles) of the periphery electrode 40, which is on the periphery of the electrode of interest, before and after the switching are identical to each other, that the positions and the directions of the current of the periphery electrode 40 before and after the switching are identical to each other, and that orders of electrical connection in the identical function of the periphery electrode 40 before and after the switching are identical to each other. Here, in FIG. 9 and FIG. 10, functions of the electrodes 40, directions of currents of the electrodes 40, and the orders of electrical connection of the electrodes 40 are only indicated for ease of illustration. Also, although the directions of the currents of the electrodes 40, and the orders of the electrical connection of the electrodes 40 are periodically changed since the currents are alternating currents, the directions of the currents and the orders of the electrical connection are indicated at a point of time.

Also, in FIGS. 9 and 10, the direction of the current of the electrode 40 is indicated by an arrow of solid line, dashed lines, dashed lines with single dots, or dashed lines with double dots. The order of the electrical connection of the electrode 40 is indicated by a number encircled by a solid line, dashed lines, dashed lines with single dots, or dashed lines with double dots. The electrical connection order of the electrodes 40 is 4-3-2-1. The most upstream side is indicated by 4, and the most downstream side is indicated by 1. That is, the highest potential is indicated by 4, and the lowest potential is indicated by 1.

In FIG. 9, the primary drive electrode PD of 4, the primary drive electrode PD of 3, the primary drive electrode PD of 2, and the primary drive electrode PD of 1 as the four primary drive electrodes PD are connected in this order so that a current flows in this order. The same goes for the secondary drive electrodes SD, the primary detection electrodes PPO and the secondary detection electrodes SPO. Also, the same goes for the primary drive electrodes PD, the secondary drive electrodes SD, the primary detection electrodes PPO, and the secondary detection electrodes SPO shown in FIG. 10.

If not the electrodes 40 themselves but the functions of the electrodes 40 are watched with interest, the electrodes 40*b*, 40*d*, 40*f*, and 40*h* are electrically connected in this order in series to each other so that the current flows in this order. Also, the electrodes 40*e*, 40*c*, 40*a* and 40*g* are electrically connected in this order in series to each other so that the current flows in this order. Also, the electrodes 40*l*, 40*n*, 40*p* and 40*j* are electrically connected in this order in series to each other so that the current flows in this order. Also, the electrodes 40*k*, 40*i*, 40*o* and 40*m* are electrically connected in this order in series to each other so that the current flows in this order. In the first embodiment, currents flow through two electrodes 40 (electrodes 40*b*, 40*j*, and the like) that are connected in parallel to each other in opposite directions.

The following description describes a principle of making a potential difference between the electrode 40 that has the certain function and another electrode 40 that is arranged on a periphery of the electrode that has the certain function unchanged before and after the switching with reference to FIGS. 9 and 10.

For example, in a case in which the primary drive electrode PD of 4 is watched with interest, before the switching, the primary detection electrode PPO of 1 through which an opposite directional current, which flows in a direction opposite to a current of the electrode of interest, flows exists in a part of the vibrator 20, which is common to the primary drive electrode PD of 4, on the exterior side in the radial direction; the secondary detection electrode SD of 3 through which a common directional current, which flows in a direction common to the current of the electrode of interest, flows exists in a part on the interior side in the radial direction and on an outgoing side in a direction of the current of the primary drive electrode PD of 4; the secondary detection electrode SPO of 4 through which an opposite directional current flows exists in a part on the exterior side in the radial direction and on the outgoing side; the secondary drive electrode SD of 2 through which an opposite directional current flows exists in a part on the interior side in the radial direction and on an incoming side in the direction of the current of the primary drive electrode PD of 4; and the secondary detection electrode SPO of 3 through which a common directional current flows exists in a part on the exterior side in the radial direction and on the incoming side.

After the switching, a position of the primary drive electrode PD of 4 is changed to a position rotated by 135 degrees clockwise on the interior side in the radial direction but the current of the electrode of interest is reversed before and after the switching. Also, even after the switching, the primary detection electrode PPO of 1 through which an opposite directional current, which flows in a direction opposite to a current of the primary drive electrode PD of 4, flows exists in a part of the vibrator 20, which is common to the primary drive electrode PD of 4, on the exterior side in the radial direction; the secondary detection electrode SD of 3 through which a common directional current, which flows in a direction common to the current of the electrode of interest, flows exists in a part on the interior side in the radial direction and on an outgoing side in a direction of the current of the primary drive electrode PD of 4; the secondary detection electrode SPO of 4 through which an opposite directional current flows exists in a part on the exterior side in the radial direction and on the outgoing side; the secondary drive electrode SD of 2 through which an opposite directional current flows exists in a part on the interior side in the radial direction and on an incoming side in the direction of the current of the primary drive electrode PD of 4; and the secondary detection electrode SPO of 3 through which a common directional current flows exists in a part on the exterior side in the radial direction and on the incoming side.

In other words, there exist the electrodes 40 that have the same potentials before and after the switching (primary detection electrode PPO of 1, secondary drive electrode SD of 3, secondary detection electrode SPO of 4, secondary drive electrode SD of 2, and secondary detection electrode SPO of 3) on a periphery of the primary drive electrode PD of 4. Accordingly, potential differences between the primary drive electrode PD of 4 and the periphery electrodes 40 before and after the switching are equal to each other. In this case, the primary drive electrode PD of 4 satisfies conditions, with respect to the reference position and the reference direction of the current of the electrode 40 of interest (primary drive electrode PD of 4) that is to be switched, that the positions and the functions of the periphery electrodes 40, which are arranged on the periphery of the electrode of interest, before and after the switching are identical to each other, that the positions and the directions of the current of the periphery electrodes 40 before and after the switching are identical to each other, and that the positions of the periphery electrodes 40 and orders of electrical connection in their functions before and after the switching are identical to each other.

Although the electrodes 40 (the primary detection electrode PPO of 1, the secondary drive electrode SD of 3, the secondary detection electrode SPO of 4, the secondary drive electrode SD of 2, and the secondary detection electrode SPO of 3) that are close to the primary drive electrode PD of 4 are described, the primary drive electrode PD of 4 satisfies the aforementioned conditions in relations to other electrodes 40 other than the close electrodes 40.

Although the primary drive electrode PD of 4 is described, the other primary drive electrodes PD, the secondary drive electrodes SD, the primary detection electrodes PPO, and the secondary detection electrodes SPO also satisfy the aforementioned conditions. For this reason, in a case in which any of the four primary drive electrodes PD, the four secondary drive electrodes SD, the four primary detection electrodes PPO and the four secondary detection electrodes SPO is watched with interest, potential differences between the electrode of interest and the periphery electrodes 40 before and after the switching are equal to each other.

Also, in the first embodiment, the positions of the electrodes 40 on the surface of the vibrator 20, the directions of the currents of the electrodes 40, and the orders of electrical connection in each of functions of the electrodes 40 in the primary drive electrode PD, the primary detection electrode PPO, the secondary detection electrode SPO and the secondary drive electrode SD are set to make the positions of pairs of the electrodes 40 that are set to switch with each other on the surface of the vibrator 20, the directions of the currents of the pairs of the electrodes, and the orders of electrical connection in each of the functions of the electrodes 40 of the pairs of the electrodes reflection symmetric with respect to an imaginary symmetry axis As.

For example, the primary drive electrode PD of 4 is watched with interest. A reflection symmetric position with respect to the imaginary symmetry axis As corresponding to the primary drive electrode PD of 4 before switching is a position that is rotated from a position of the primary drive electrode PD of 4 by 135 degrees clockwise, which is an angle for detecting and counteracting the secondary vibration, and as a result the secondary drive electrode SD or the secondary detection electrode SPO is necessarily arranged. Also, a direction of the current at this position is opposite (reflection symmetric) to the position of the primary drive electrode PD of 4, and an order of connection of a function at this position is equal (reflection symmetric) to an order of connection of the primary drive electrode PD of 4. Specifically, positions of a pair of electrodes 40*b* and 40*e* that are set to switch with each other on the surface of the vibrator 20 are symmetric to each other with respect to the imaginary symmetry axis As. Also, a direction of a current flowing through the electrode 40*b* and a direction of the current flowing through the electrode 40*e* are opposite to each other, and as a result the directions of the currents are symmetric to each other with respect to the imaginary symmetry axis As. Also, the orders of electrical connection of the electrode 40*b* and the electrode 40*e* are the same number (4), and as a result it can be said that the orders of electrical connection of the electrodes are symmetric to each other with respect to the imaginary symmetry axis As. The same goes for the other primary drive electrodes PD other than the primary drive electrode PD of 4, the secondary drive electrodes SD, the primary detection electrodes PPO, and the secondary detection electrodes SPO.

Current inflow points P11 to P14 and current outflow points P21 to 24 are also are symmetric with respect to the imaginary symmetry axis As before and after the switching.

The inflow point P11 is an inflow point of a current into a current path of the four primary drive electrodes PD before the switching, and becomes an inflow point of a current into a current path of the four secondary drive electrodes SD after the switching. Similarly, the inflow point P12 is an inflow point of a current into a current path of the four secondary drive electrodes SD before the switching, and becomes an inflow point of a current into a current path of the four primary drive electrodes PD after the switching. Also, the inflow point P13 is an inflow point of a current into a current path of the four primary detection electrodes PPO before the switching, and becomes an inflow point of a current into a current path of the four secondary detection electrodes SPO after the switching. Also, the inflow point P14 is an inflow point of a current into a current path of the four secondary detection electrodes SPO before the switching, and becomes an inflow point of a current into a current path of the four primary detection electrodes PPO after the switching.

For example, the inflow point P11, which is the inflow point of the current into the current path of the four primary drive electrodes PD before switching, and the inflow point P12, which is the inflow point of the current into the current path of the four primary drive electrodes PD after switching, are symmetric to each other with respect to the imaginary symmetry axis As. In other words, the inflow point P12, which is the inflow point of the current into the current path of the four secondary drive electrodes SD before switching, and the inflow point P11, which is the inflow point of the current into the current path of the four secondary drive electrodes SD after switching, are symmetric to each other with respect to the imaginary symmetry axis As. The same goes for the inflow points P13 and 14 (the primary detection electrode PPO and the secondary detection electrode SPO).

Also, the outflow point P21 is an outflow point of a current from the current path of the four primary drive electrodes PD before the switching, and becomes an outflow point of a current from the current path of the four secondary drive electrodes SD after the switching. Similarly, the outflow point P22 is an outflow point of a current from the current path of the four secondary drive electrodes SD before the switching, and becomes an outflow point of a current from the current path of the four primary drive electrodes PD after the switching. Also, the outflow point P23 is an outflow point of a current from the current path of the four primary detection electrodes PPO before the switching, and becomes an outflow point of a current from the current path of the four secondary detection electrodes SPO after the switching. Also, the outflow point P24 is an outflow point of a current from the current path of the four secondary detection electrodes SPO before the switching, and becomes an outflow point of a current from the current path of the four primary detection electrodes PPO after the switching.

For example, the outflow point P21, which is the outflow point of the current into the current path of the four primary drive electrodes PD before switching, and the outflow point P22, which is the outflow point of the current into the current path of the four primary drive electrodes PD after switching, are symmetric to each other with respect to the imaginary symmetry axis As. In other words, the outflow point P22, which is the outflow point of the current into the current path of the four secondary drive electrodes SD before switching, and the outflow point P21, which is the outflow point of the current into the current path of the four secondary drive electrodes SD after switching, are symmetric to each other with respect to the imaginary symmetry axis As.

The same goes for the outflow points P23 and 24 (the primary detection electrode PPO and the secondary detection electrode SPO).

Also, the inflow points P11 to P14 can be said the inflow point P11 of a current into a current path of the electrodes 40*b*, 40*d*, 40*f* and 40*h*, the inflow point P12 of a current into a current path of the electrodes 40*e*, 40*c*, 40*a* and 40*g*, the inflow point P13 of a current into the current path of the electrodes 40*l*, 40*n*, 40*p* and 40*j*, and the inflow point P14 of a current into the current path of the electrodes 40*k*, 40*i*, 40*o* and 40*m*. The inflow points P11 and P14 are symmetric to the inflow points P12 and P13, respectively, with respect to the imaginary symmetry axis As.

Also, the outflow points P21 to P24 can be said the outflow point P21 of a current from a current path of the electrodes 40*b*, 40*d*, 40*f* and 40*h*, the outflow point P22 of a current from a current path of the electrodes 40*e*, 40*c*, 40*a* and 40*g*, the outflow point P23 of a current from the current path of the electrodes 40*l*, 40*n*, 40*p* and 40*j*, and the outflow point P24 of a current from the current path of the electrodes 40*k*, 40*i*, 40*o* and 40*m*. The outflow points P21 and P23 are symmetric to the outflow points P22 and P24, respectively, with respect to the imaginary symmetry axis As.

The imaginary symmetry axis As is an axis passing through the center of the vibrator 20 and the centers between the electrodes 40 and extending in the radial direction. In FIGS. 9 and 10, the imaginary symmetry axis As passes through the center of the vibrator 20, and the centers between the primary drive electrodes PD and the secondary drive electrodes SD (between the primary detection electrode PPO and the secondary detection electrode SPO) that switch with each other, and extends in the radial direction. Also, the imaginary symmetry axis As passes through the center of the vibrator 20, the center between the electrodes 40*c* and 40*d* (between the electrodes 40*k* and 40*l*), and the center between the electrodes 40*g* and 40*h* (between the electrodes 40*o* and 40*p*), and extends in the radial direction. In a case in which the primary drive electrode PD and one of the secondary drive electrode SD and the secondary detection electrode SPO are alternately arranged, and the primary detection electrode PPO and another of the secondary drive electrode SD and the secondary detection electrode SPO are alternately arranged, the imaginary symmetry axis As can be set between any pair of the electrodes as long as directions of the currents of the electrodes, and orders of electrical connection in each of functions of the electrodes are symmetric with respect to the imaginary symmetry axis As.

In the first embodiment, the electrodes in each of functions of the primary drive electrodes PD, the primary detection electrodes PPO, the secondary detection electrodes SPO, and the secondary drive electrodes SD are electrically connected in a clockwise or counterclockwise order. The primary drive electrodes PD are electrically connected in a clockwise order in FIG. 9, and the primary drive electrodes PD are electrically connected in a counterclockwise order in FIG. 10. Also, the secondary drive electrodes SD are electrically connected in a clockwise order in FIG. 9, and the secondary drive electrodes SD are electrically connected in a counterclockwise order in FIG. 10. Also, the primary detection electrodes PPO are electrically connected in a clockwise order in FIG. 9, and the primary detection electrodes PPO are electrically connected in a counterclockwise order in FIG. 10. The secondary detection electrodes SPO are electrically connected in a clockwise order in FIG. 9, and the secondary detection electrodes SPO are electrically connected in a counterclockwise order in FIG. 10.

Also, the electrodes 40*b*, 40*d*, 40*f*, 40*h* are electrically connected in a clockwise order. Also, the electrodes 40*e*, 40C, 40*a*, 40G are electrically connected in a counterclockwise order. Also, the electrodes 40*l*, 40*n*, 40*p*, 40*j* are electrically connected in a clockwise order. Also, the electrodes 40*k*, 40*i*, 40*o*, 40*m* are electrically connected in a counterclockwise order.

(Detailed Electrical Connection Between Electrodes)

The following description describes detailed electrical connection between electrodes 40 with reference to FIG. 11.

Electrical connection between the electrodes 40*b*, 40*d*, 40*f* and 40*h* is first described. The electrode 40*b* of 4 and the electrode 40*d* of 3 are electrically connected to each other by a wiring part on the vibrating gyro element 100. The electrode 40*d* of 3 and the electrode 40*f* of 2 are electrically connected to each other by a wiring part on the board side. The electrode 40*f* of 2 and the electrode 40*h* of 1 are electrically connected to each other by a wiring part on the vibrating gyro element 100. Although not specifically limited, metal wiring, wiring part bonding, or the like is used for a technique of the electrical connection.

Specifically, one end of the electrode 40*b* is electrically connected to an electrode pad 71*a* through a wiring part 71*b* as shown in FIG. 11. The electrode pad 71*a* is electrically connected to the primary alternating current source 110 before the switching, and to the secondary alternating current source 130 after the switching. Another end of the electrode 40*b* is electrically connected to one end of the electrode 40*d* through a wiring part 71*c*.

Another end of the electrode 40*d* is electrically connected to an electrode pad 71*e* through a wiring part 71*d*. The electrode pad 71*e* is electrically connected to an electrode pad 71*f* through a wiring part on the board side. The electrode pad 71*f* is electrically connected to one end of the electrode 40*f* through a wiring part 71*g*. Another end of the electrode 40*f* is electrically connected to one end of the electrode 40*h* through a wiring part 71*h*. Another end of the electrode 40*h* is electrically connected to an electrode pad 71*j* through a wiring part 71*i*. The electrode pad 71*j* is electrically connected to the primary alternating current source 110 before the switching, and to the secondary alternating current source 130 after the switching. Accordingly, the electrodes 40*b*, 40*d*, 40*f* and 40*h* are electrically connected to each other.

Electrical connection between the electrodes 40*e*, 40*c*, 40*a* and 40*g* is now described. The electrode 40*e* of 4 and the electrode 40*c* of 3 are electrically connected to each other by a wiring part on the vibrating gyro element 100. The electrode 40*c* of 3 and the electrode 40*a* of 2 are electrically connected to each other by a wiring part on the board side. The electrode 40*a* of 2 and the electrode 40*g* of 1 are electrically connected to each other by a wiring part on the vibrating gyro element 100.

Specifically, one end of the electrode 40*e* is electrically connected to an electrode pad 72*a* through a wiring part 72*b*. The electrode pad 72*a* is electrically connected to the secondary alternating current source 130 before the switching, and to the primary alternating current source 110 after the switching. Another end of the electrode 40*e* is electrically connected to an electrode pad 72*d* through a wiring part 72*c*. The electrode pad 72*d* is electrically connected to an electrode pad 72*f* through a wiring part 72*e*. The electrode pad 72*f* is electrically connected to one end of the electrode 40*c* through a wiring part 72*g*.

Another end of the electrode 40*c* is electrically connected to an electrode pad 72*i* through a wiring part 72*h*. The electrode pad 72*i* is electrically connected to an electrode pad 72*j* through a wiring part on the board side. The electrode pad 72*j* is electrically connected to one end of the electrode 40*a* through a wiring part 72*k*. Another end of the electrode 40*a* is electrically connected to an electrode pad 72*m* through a wiring part 72*l*. The electrode pad 72*m* is electrically connected to an electrode pad 720 through a wiring part 72*n*. The electrode pad 720 is electrically connected to one end of the electrode 40*g* through a wiring part 72*p*. Another end of the electrode 40*g* is electrically connected to an electrode pad 72*r* through a wiring part 72*q*. The electrode pad 72*r* is electrically connected to the secondary alternating current source 130 before the switching, and to the primary alternating current source 110 after the switching. Accordingly, the electrodes 40*e*, 40*c*, 40*a* and 40*g* are electrically connected to each other.

Electrical connection between the electrodes 40*l*, 40*n*, 40*p* and 40*j* is now described. The electrode 40*l* of 4 and the electrode 40*n* of 3 are electrically connected to each other by a wiring part on the vibrating gyro element 100. The electrode 40*n* of 3 and the electrode 40*p* of 2 are electrically connected to each other by a wiring part on the board side. The electrode 40*p* of 2 and the electrode 40*j* of 1 are electrically connected to each other by a wiring part on the vibrating gyro element 100.

Specifically, one end of the electrode 40*l* is electrically connected to an electrode pad 73*a* through a wiring part 73*b*. The electrode pad 73*a* is electrically connected to the primary detector 120 before the switching, and to the secondary detector 140 after the switching. Another end of the electrode 40*l* is electrically connected to an electrode pad 73*d* through a wiring part 73*c*. The electrode pad 73*d* is electrically connected to an electrode pad 73*f* through a wiring part 73*e*. The electrode pad 73*f* is electrically connected to one end of the electrode 40*n* through a wiring part 73*g*.

Another end of the electrode 40*n* is electrically connected to an electrode pad 73*i* through a wiring part 73*h*. The electrode pad 73*i* is electrically connected to an electrode pad 73*j* through a wiring part on the board side. The electrode pad 73*j* is electrically connected to one end of the electrode 40*p* through a wiring part 73*k*. Another end of the electrode 40*p* is electrically connected to an electrode pad 73*m* through a wiring part 73*l*. The electrode pad 73*m* is electrically connected to an electrode pad 730 through a wiring part 73*n*. The electrode pad 730 is electrically connected to one end of the electrode 40*j* through a wiring part 73*p*. Another end of the electrode 40*j* is electrically connected to an electrode pad 73*r* through a wiring part 73*q*. The electrode pad 73*r* is electrically connected to the primary detector 120 before the switching, and to the secondary detector 140 after the switching. Accordingly, the electrodes 40*l*, 40*n*, 40*p* and 40*j* are electrically connected to each other.

Electrical connection between the electrodes 40*k*, 40*i*, 40*o* and 40*m* is now described. The electrode 40*k* of 4 and the electrode 40*i* of 3 are electrically connected to each other by a wiring part on the vibrating gyro element 100. The electrode 40*i* of 3 and the electrode 40*o* of 2 are electrically connected to each other by a wiring part on the board side. The electrode 40*o* of 2 and the electrode 40*m* of 1 are electrically connected to each other by a wiring part on the vibrating gyro element 100.

Specifically, one end of the electrode 40*k* is electrically connected to an electrode pad 74*a* through a wiring part 74*b*.

The electrode pad 74*a* is electrically connected to the secondary detector 140 before the switching, and to the primary detector 120 after the switching. Another end of the electrode 40*k* is electrically connected to an electrode pad 74*d* through a wiring part 74*c*. The electrode pad 74*d* is electrically connected to an electrode pad 74*f* through a wiring part 74*e*. The electrode pad 74*f* is electrically connected to one end of the electrode 40*i* through a wiring part 74*g*.

Another end of the electrode 40*i* is electrically connected to an electrode pad 74*i* through a wiring part 74*h*. The electrode pad 74*i* is electrically connected to an electrode pad 74*j* through a wiring part on the board side. The electrode pad 74*j* is electrically connected to one end of the electrode 40*o* through a wiring part 74*k*. Another end of the electrode 40*o* is electrically connected to an electrode pad 74*m* through a wiring part 74*l*. The electrode pad 74*m* is electrically connected to an electrode pad 740 through a wiring part 74*n*. The electrode pad 740 is electrically connected to one end of the electrode 40*m* through a wiring part 74*p*. Another end of the electrode 40*m* is electrically connected to an electrode pad 74*r* through a wiring part 74*q*. The electrode pad 74*r* is electrically connected to the secondary detector 140 before the switching, and to the primary detector 120 after the switching. Accordingly, the electrodes 40*k*, 40*i*, 40*o* and 40*m* are electrically connected to each other.

Advantages of First Embodiment

In the first embodiment, the following advantages are obtained.

As described above, a vibrating gyro element 100 according to the first embodiment is an electromagnetically driven vibrating gyro element 100 including a stationary part 10; a vibrator 20; a support 30 connecting the vibrator 20 to the stationary part 10 for supporting the vibrator 20 to allow the vibrator to vibrate; a plurality of electrodes 40 arranged on a surface of the vibrator 20 to be spaced at an interval away from each other in a circumferential direction of the vibrator 20 and to form lines; and a magnetic field applier 60 for applying a magnetic field to the electrodes 40, wherein the vibrator 20 has a vibration mode of cos Nθ (where N is a natural number not smaller than 2), the electrodes 40 include a primary drive electrode PD for exciting the vibrator 20 to primary vibration, a primary detection electrode PPO for detecting the primary vibration, a secondary detection electrode SD for detecting secondary vibration of the vibrator 20, and a secondary drive electrode SPO for driving the vibrator 20 to counteract the secondary vibration, the primary drive electrode PD is configured to be able to switch with one of the secondary drive electrode SD, and the primary detection electrode PPO is configured to be able to switch with the secondary detection electrode SPO, and electrical connection in the primary drive electrodes PD, the primary detection electrodes PPO, the secondary detection electrodes SD and the secondary drive electrodes SPO is set to make, with respect to a position and a direction of a current of the electrode 40 of interest to be switched as reference, potential differences between the electrode of interest, and the electrodes 40 that are arranged on a periphery of the electrode of interest unchanged before and after the switching.

According to this configuration, since potential differences between the electrode 40 that has the certain function and the periphery electrode 40 before and after the switching can be equal to each other, an effect of a magnetic field caused by a displacement current can be equally superimposed on each of output signals before and after the switching. As a result, for example, in a case in which one of the output signals before and after the switching is subtracted from another, the effect (bias component) of the magnetic field caused by the displacement current can be sufficiently canceled (zero or close to zero). In other words, it is possible to sufficiently cancel the effect (bias component) of the magnetic field caused by the displacement current in a switching configuration. In addition, since the effect of the magnetic field (bias component) caused by the displacement current can be sufficiently canceled, it is possible to improve detection accuracy of an angular velocity in a gyroscope 101 including the vibrating gyro element 100.

In the first embodiment, as described above, electrical connection in the primary drive electrode PD, the primary detection electrode PPO, the secondary detection electrode SPO and the secondary drive electrode SD is set to satisfy conditions, with respect to the reference position and the reference direction of the current of the electrode of interest that is to be switched, that the positions and functions of the periphery electrode 40, which is on the periphery of the electrode of interest, before and after the switching are identical to each other, that the positions and the directions of the current of the periphery electrode 40 before and after the switching are identical to each other, and that orders of electrical connection in the identical function of the periphery electrode 40 before and after the switching are identical to each other. Accordingly, since potential differences between the electrode 40 that has the certain function and the periphery electrode 40 before and after the switching can be easily brought equal to each other, an effect (bias component) of a magnetic field caused by a displacement current can be easily sufficiently canceled.

In the first embodiment, as described above, the positions of the electrodes 40 on the surface of the vibrator 20, the directions of the currents of the electrodes 40, and the orders of electrical connection in each of functions of the electrodes 40 in the primary drive electrode PD, the primary detection electrode PPO, the secondary detection electrode SPO and the secondary drive electrode SD are set to make the positions of pairs of the electrodes that are set to switch with each other on the surface of the vibrator, the directions of the currents of the pairs of the electrodes, and the orders of electrical connection in each of the functions of the electrodes 40 of the pairs of the electrodes reflection symmetric with respect to an imaginary symmetry axis As that passes through a center of the vibrator 20 and extends in a radial direction of the vibrator 20. Accordingly, it is possible to realize a configuration that brings potential differences between the electrode 40 that has the certain function and the periphery electrode 40 before and after the switching equal to each other without changing the directions of current, and the orders of electrical connection of the electrodes 40 (i.e., without changing current paths of the functions) before and after the switching. As a result, a structure such as a switch for changing current paths is not required dissimilar to a configuration that brings potential differences between the electrode 40 that has the certain function and the periphery electrode 40 before and after the switching equal to each other by changing at least the directions of currents or the orders of electrical connection of the electrodes 40 (i.e., by changing current paths of the functions) before and after the switching. Consequently, it is possible to realize a structure that brings potential differences between the electrode 40 that has the certain function and the periphery electrode 40 before and after the switching equal to each other by using a simple structure.

In the first embodiment, as described above, the electrodes 40 in a plurality of lines are arranged on the surface of the vibrator 20 to extend side by side and to be spaced at an interval away from each other in the circumferential direction of the vibrator 20. Accordingly, it is possible to easily arrange a plurality of lines of electrodes 40 on the surface of the vibrator 20.

In the first embodiment, as described above, the primary drive electrode PD and one of the secondary detection electrode SPO and the secondary drive electrode SD are alternately arranged in a common line; and the primary detection electrode PPO and another of the secondary detection electrode SPO and the secondary drive electrode SD are alternately arranged in a common line. According to this configuration, since pairs of the primary drive electrodes PD and the secondary detection electrodes SPO or the secondary drive electrodes SD for switching with each other are arranged together in one line, and pairs of the primary detection electrodes PPO and the secondary drive electrodes SD or the secondary detection electrodes SPO for switching with each other are arranged together in another line, the electrodes 40 as the primary drive electrode PD, the primary detection electrode PPO, the secondary detection electrode SPO and the secondary drive electrode SD can be arranged in balance. Also, since electrodes 40 as the primary drive electrode PD, the primary detection electrode PPO, the secondary detection electrode SPO, and the secondary drive electrode SD are alternately arranged, it is possible to easily define the imaginary symmetry axis As.

In the first embodiment, as described above, the electrodes in each of functions of the primary drive electrodes PD, the primary detection electrodes PPO, the secondary detection electrodes SPO, and the secondary drive electrodes SD are electrically connected in a clockwise or counterclockwise order. Accordingly, it is possible to simplify structures of wiring parts for electrical connection between electrode 40 in the electrodes 40 as each of the primary drive electrode PD, the primary detection electrode PPO, the secondary detection electrode SPO, and the secondary drive electrode SD.

Second Embodiment

The following description describes a configuration of a vibrating gyro element 200 according to a second embodiment with reference to FIGS. 12 to 15. The following description describes exemplary arrangement in which the primary drive electrodes PD, the primary detection electrodes PPO, the secondary detection electrodes SPO, and the secondary drive electrodes SD are arranged in their corresponding two bearing directions in the second embodiment dissimilar to the first embodiment in which the primary drive electrodes PD, the primary detection electrodes PPO, the secondary detection electrodes SPO, and the secondary drive electrodes SD are arranged in their corresponding four bearing directions. Configurations similar to the first embodiment are denoted by the same reference numerals in the drawings, and their description is omitted.

Figure 12:
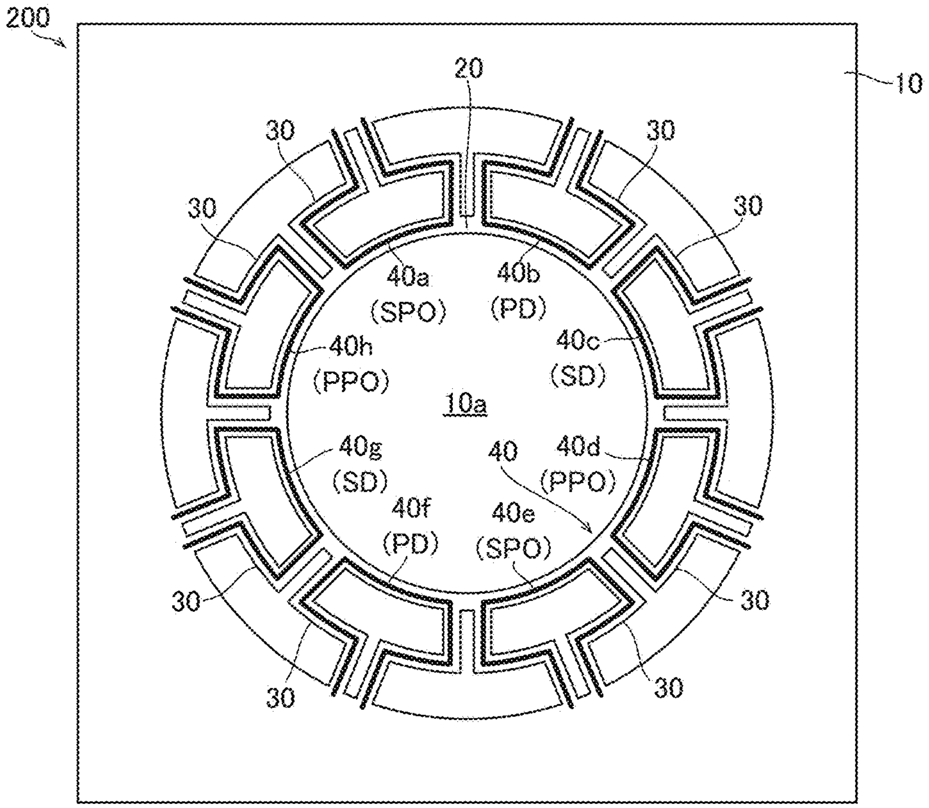
FIG. 12 is a plan view showing a vibrating gyro element before switching according to a second embodiment.
Figure 13:
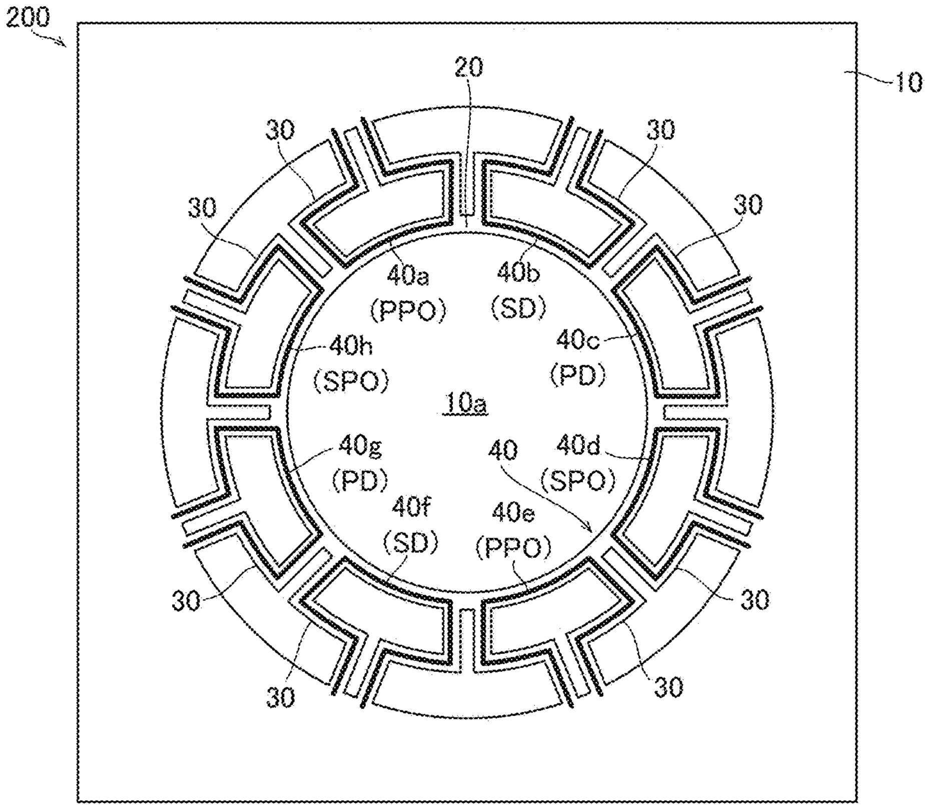
FIG. 13 is a plan view showing the vibrating gyro element after the switching according to the second embodiment.

As shown in FIG. 12 and FIG. 13, the vibrating gyro element 200 according to the second embodiment includes the electrodes 40*a* to 40*h* but does not include the electrodes 40*i* to 40*p* dissimilar to the vibrating gyro element 100 according to the aforementioned first embodiment. In other words, not two electrodes 40 are formed on one support 30, but one electrode 40 is formed on one support 30 in the vibrating gyro element 200 dissimilar to the vibrating gyro element 100 according to the aforementioned first embodiment.

In the second embodiment, before the switching, the electrodes 40*b* and 40*f*, which are connected in series to each other, are electrically connected to the primary alternating current source 110, and serve as the primary drive electrodes PD; and the electrodes 40*c*, 40*g*, which are connected in series to each other, are electrically connected to the secondary alternating current source 130, and serve as the secondary drive electrodes SD; the electrodes 40*d* and 40*h*, which are connected in series to each other, are electrically connected to the primary detector 120, and serve as the primary detection electrodes PPO; and the electrodes 40*a* and 40*e*, which are connected in series to each other, are electrically connected to the secondary detector 140, and serve as the secondary detection electrodes SPO.

Also, after the switching, the electrodes 40*b* and 40*f*, which are connected in series to each other, are electrically connected to the primary alternating current source 130, and serve as the primary drive electrodes SD; and the electrodes 40*c*, 40*g*, which are connected in series to each other, are electrically connected to the secondary alternating current source 110, and serve as the primary drive electrodes PD; the electrodes 40*d* and 40*h*, which are connected in series to each other, are electrically connected to the secondary detector 140, and serve as the secondary detection electrodes SPO; and the electrodes 40*a* and 40*e*, which are connected in series to each other, are electrically connected to the secondary detector 120, and serve as the primary detection electrodes PPO.

One of the two primary drive electrodes PD, one of the two secondary drive electrodes SD, one of the two primary detection electrodes PPO, and one of the two secondary detection electrodes SPO are arranged at 180 degrees away from another.

Figure 14:
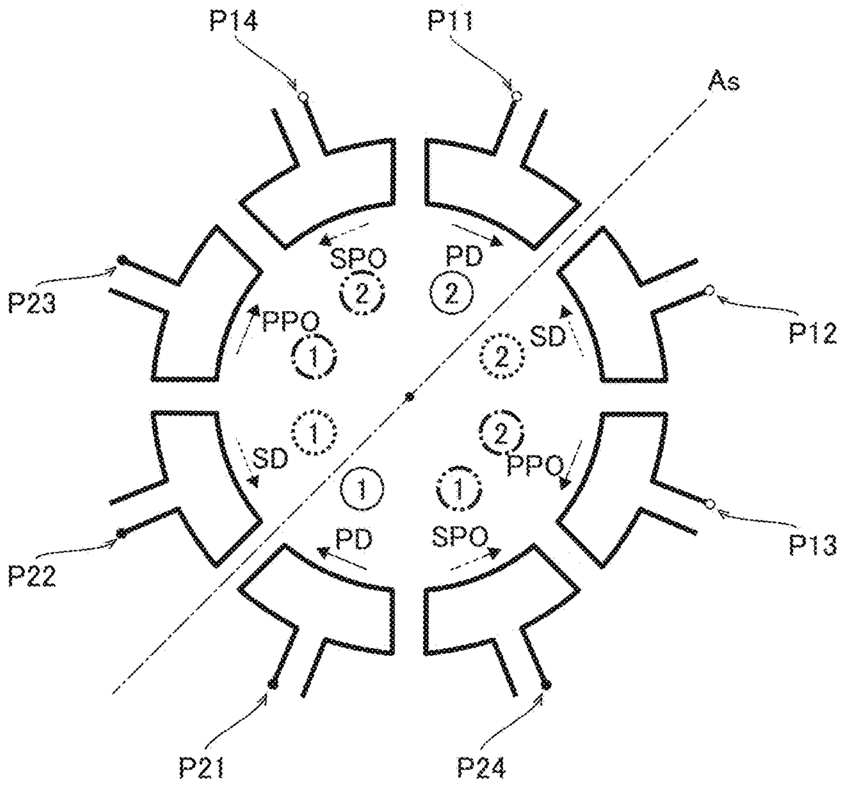
FIG. 14 is a plan view illustrating functions of electrodes, directions of currents, and orders of connection of the electrodes of the vibrating gyro element before the switching in the second embodiment.
Figure 15:
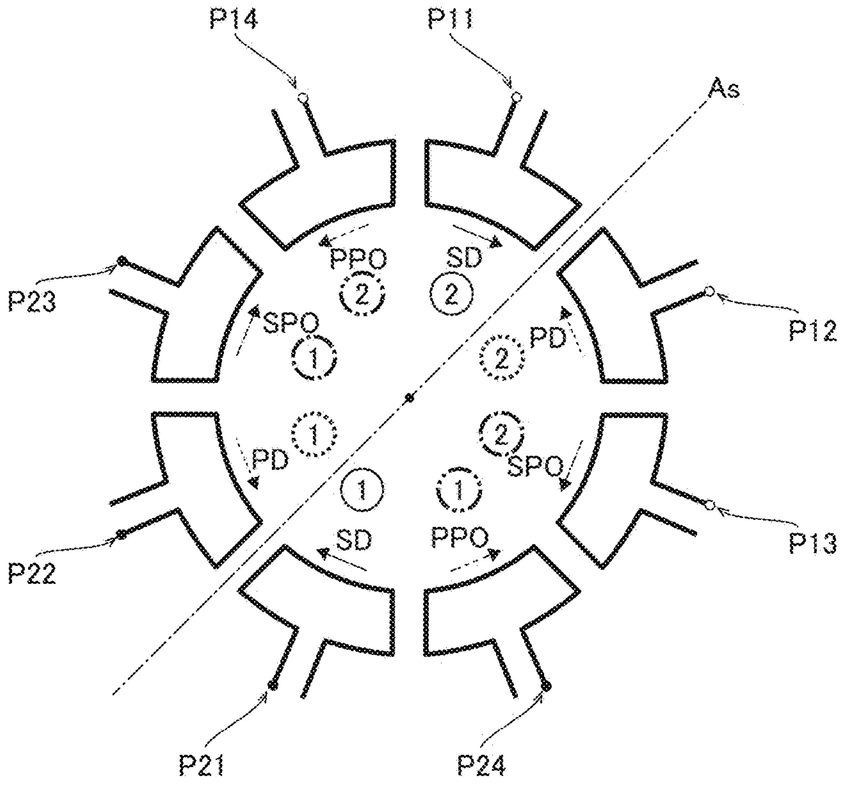
FIG. 15 is a plan view illustrating functions of the electrodes, directions of currents, and orders of connection of the electrodes of the vibrating gyro element after the switching in the second embodiment.

Here, in the second embodiment, as shown in FIGS. 14 and 15, electrical connection in the primary drive electrodes PD, the primary detection electrodes PPO, the secondary detection electrodes SPO, and the secondary drive electrodes SD is set to make, with respect to a reference position and a reference direction of the current of the electrode 40 of interest that is to be switched, a potential difference between the electrode of interest and the electrode 40 that is arranged on the periphery of the electrode of interest unchanged before and after the switching. Specifically, electrical connection in the primary drive electrode PD, the primary detection electrode PPO, the secondary detection electrode SPO and the secondary drive electrode SD is set to satisfy conditions, with respect to the reference position and the reference direction of the current of the electrode 40 of interest that is to be switched, that the positions and functions of the periphery electrode 40, which is on the periphery of the electrode of interest, before and after the switching are identical to each other, that the positions and the directions of the current of the periphery electrode 40 before and after the switching are identical to each other, and that the positions and orders of electrical connection in the identical function of the periphery electrode 40 before and after the switching are identical to each other. Here, in FIGS. 14 and 15, electrical connection order of the electrodes 40 is 2-1. The most upstream side is indicated by 2, and the most downstream side is indicated by 1. That is, the highest potential is indicated by 2, and the lowest potential is indicated by 1.

In FIG. 14, the primary drive electrode PD of 2, and the primary drive electrode PD of 1 as the two primary drive electrodes PD are connected in this order so that a current flows in this order. The same goes for the secondary drive electrodes SD, the primary detection electrodes PPO and the secondary detection electrodes SPO. Also, the same goes for the primary drive electrodes PD, the secondary drive electrodes SD, the primary detection electrodes PPO, and the secondary detection electrodes SPO shown in FIG. 15.

If not the functions of the electrodes 40 but the electrodes 40 themselves are watched with interest, the electrodes 40*b* and 40*f* are electrically connected in this order in series to each other so that the current flows in this order. Also, the electrodes 40*c* and 40*g* are electrically connected in this order in series to each other so that the current flows in this order. Also, the electrodes 40*a* and 40*e* are electrically connected in this order in series to each other so that the current flows in this order. Also, the electrodes 40*d* and 40*h* are electrically connected in this order in series to each other so that the current flows in this order.

Here, a principle of making a potential difference between the electrode 40 that has the certain function and another electrode 40 that is arranged on the periphery of the electrode that has the certain function unchanged before and after the switching in FIGS. 14 and 15 is similar to the aforementioned first embodiment.

That is, in a case in which the primary drive electrode PD of 2 is watched with interest, before the switching, the secondary drive electrodes SD of 2 through which an opposite directional current, which flows in a direction opposite to a current of the electrode of interest, flows exists in a part on an outgoing side in a direction of the current of the primary drive electrode PD of 2; and the secondary detection electrode SPO of 2 through which an opposite directional current exists in a part on an incoming side in a direction of the current of the primary drive electrode PD of 2. After the switching, a position of the primary drive electrode PD of 2 is changed to a position rotated by 45 degrees clockwise but the current of the electrode of interest is reversed before and after the switching. Also, after the switching, the secondary drive electrode SD of 2 through which an opposite directional current, which flows in a direction opposite to a current of the electrode of interest, flows still exists in a part on the outgoing side in a direction of the current of the primary drive electrode PD of 2; and the secondary detection electrode SPO of 2 through which an opposite directional current still exists in a part on the incoming side in the direction of the current of the primary drive electrode PD of 2.

There exist the electrodes 40 that have the same potentials before and after the switching (secondary drive electrode SD of 2, and secondary detection electrode SPO of 2) on a periphery of the primary drive electrode PD of 2. Accordingly, potential differences between the primary drive electrode PD of 2 and the periphery electrodes 40 before and after the switching are equal to each other. Here, the primary drive electrode PD of 2 satisfies, with respect to the reference position and the reference direction of the current of the electrode 40 of interest that is to be switched (primary drive electrode PD of 2), that the positions and functions of the periphery electrode 40, which is on the periphery of the electrode of interest, before and after the switching are identical to each other, that the positions and the directions of the current of the periphery electrode 40 before and after the switching are identical to each other, and that orders of electrical connection in the identical function of the periphery electrode 40 before and after the switching are identical to each other.

Although the electrodes 40 (the secondary drive electrode SD of 2, and the secondary detection electrode SPO of 2) that are close to the primary drive electrode PD of 2 are described, the primary drive electrode PD of 2 satisfies the aforementioned conditions in relations to other electrodes 40 other than the close electrodes 40.

Although the primary drive electrode PD of 2 is described, the other primary drive electrodes PD, the secondary drive electrodes SD, the primary detection electrodes PPO, and the secondary detection electrodes SPO also satisfy the aforementioned conditions. For this reason, in a case in which any one of the two primary drive electrodes PD, the two secondary drive electrodes SD, the two primary detection electrodes PPO and the two secondary detection electrodes SPO is watched with interest, potential differences between the electrode of interest and the periphery electrodes 40 before and after the switching are equal to each other.

Also, in the second embodiment, the positions of the electrodes 40 on the surface of the vibrator 20, the directions of the currents of the electrodes 40, and the orders of electrical connection in each of functions of the electrodes 40 in the primary drive electrode PD, the primary detection electrode PPO, the secondary detection electrode SPO and the secondary drive electrode SD are set to make the positions of pairs of the electrodes 40 that are set to switch with each other on the surface of the vibrator 20, the directions of currents of the pairs of the electrodes, and the orders of electrical connection in each of the functions of the electrodes 40 of the pairs of the electrodes reflection symmetric with respect to an imaginary symmetry axis As.

For example, the primary drive electrode PD of 2 is watched with interest. A reflection symmetric position with respect to the imaginary symmetry axis As corresponding to the primary drive electrode PD of 2 before switching is a position that is rotated from a position of the primary drive electrode PD of 4 by 45 degrees clockwise, which is an angle for detecting and counteracting the secondary vibration, and as a result the secondary drive electrode SD or the secondary detection electrode SPO is necessarily arranged. In the second embodiment, the secondary drive electrode SD is arranged at this position. Also, a direction of the current at this position is opposite (reflection symmetric) to the position of the primary drive electrode PD of 4, and an order of connection of a function at this position is equal (reflection symmetric) to an order of connection of the primary drive electrode PD of 4. Positions of a pair of electrodes 40*b* and 40*c* that are set to switch with each other on the surface of the vibrator 20 are symmetric to each other with respect to the imaginary symmetry axis As. Also, a direction of a current flowing through the electrode 40*b* and a direction of the current flowing through the electrode 40*c* are opposite to each other, and as a result, the directions of the currents are symmetric to each other with respect to the imaginary symmetry axis As. Also, the orders of electrical connection of the electrode 40*b* and the electrode 40*c* are the same number (2), and as a result, it can be said that the orders of electrical connection of the electrodes are symmetric to each other with respect to the imaginary symmetry axis As. The same goes for the other primary drive electrodes PD other than the primary drive electrode PD of 2, the secondary drive electrodes SD, the primary detection electrodes PPO, and the secondary detection electrodes SPO.

Current inflow points P11 to P14 and current outflow points P21 to 24 are also are symmetric with respect to the imaginary symmetry axis As before and after the switching.

For example, the inflow point P11, which is the inflow point of the current into the current path of the two primary drive electrodes PD before switching, and the inflow point P12, which is the inflow point of the current into the current path of the two primary drive electrodes PD after switching, are symmetric to each other with respect to the imaginary symmetry axis As. In other words, the inflow point P12, which is the inflow point of the current into the current path of the two secondary drive electrodes SD before switching, and the inflow point P11, which is the inflow point of the current into the current path of the two secondary drive electrodes SD after switching, are symmetric to each other with respect to the imaginary symmetry axis As. The same goes for the inflow points P13 and 14 (the primary detection electrode PPO and the secondary detection electrode SPO).

Also, for example, the outflow point P21, which is the outflow point of the current into the current path of the two primary drive electrodes PD before switching, and the outflow point P22, which is the outflow point of the current into the current path of the two primary drive electrodes PD after switching, are symmetric to each other with respect to the imaginary symmetry axis As. In other words, the outflow point P22, which is the outflow point of the current into the current path of the two secondary drive electrodes SD before switching, and the outflow point P21, which is the outflow point of the current into the current path of the two secondary drive electrodes SD after switching, are symmetric to each other with respect to the imaginary symmetry axis As. The same goes for the outflow points P23 and 24 (the primary detection electrode PPO and the secondary detection electrode SPO).

Also, the inflow points P11 to P14 can be said the inflow point P11 of a current into a current path of the electrodes 40*b* and 40*f*, the inflow point P12 of a current into a current path of the electrodes 40*c* and 40*g*, the inflow point P13 of a current into the current path of the electrodes 40*a* and 40*e*, and the inflow point P14 of a current into the current path of the electrodes 40*d* and 40*h*. The inflow points P11 and P14 are symmetric to the inflow points P12 and P13, respectively, with respect to the imaginary symmetry axis As.

Also, the outflow points P21 to P24 can be said the outflow point P21 of a current from a current path of the electrodes 40*b* and 40*f*, the outflow point P22 of a current from a current path of the electrodes 40*c* and 40*g*, the outflow point P23 of a current from the current path of the electrodes 40*a* and 40*e*, and the outflow point P24 of a current from the current path of the electrodes 40*d* and 40*h*. The outflow points P22 and P23 are symmetric to the outflow points P21 and P24, respectively, with respect to the imaginary symmetry axis As.

The imaginary symmetry axis As is an axis passing through the center of the vibrator 20 and the centers between the electrodes 40 and extending in the radial direction. In FIGS. 14 and 15, the imaginary symmetry axis As passes through the center of the vibrator 20, and the centers between the primary drive electrodes PD and the secondary drive electrodes SD that switch with each other, and extends in the radial direction. Also, the imaginary symmetry axis As passes through the center of the vibrator 20, the center between the electrodes 40*b* and 40*c*, and the center between the electrodes 40*f* and 40*g*, and extends in the radial direction.

The other configuration of the second embodiment is similar to the first embodiment.

Advantages of Second Embodiment

In the second embodiment, the following advantages are obtained.

In the vibrating gyro element 200 according to the second embodiment, as described above, electrical connection in the primary drive electrodes PD, the primary detection electrodes PPO, the secondary detection electrodes SPO, and the secondary drive electrodes SD is set to make, with respect to a reference position and a reference direction of the current of the electrode 40 of interest that is to be switched, a potential difference between the electrode of interest and the electrode 40 that is arranged on a periphery of the electrode of interest unchanged before and after the switching. Accordingly, similar to the aforementioned first embodiment, it is possible to sufficiently cancel the effect (bias component) of the magnetic field caused by the displacement current in a switching configuration.

The other advantages of the second embodiment are similar to the first embodiment.

Modified Embodiments

Note that the embodiment disclosed this time must be considered as illustrative in all points and not restrictive. The scope of the present invention is not shown by the above description of the embodiments but by the scope of claims for patent, and all modifications (modified embodiments) within the meaning and scope equivalent to the scope of claims for patent are further included.

For example, the orders of electrical connection of the electrodes and the imaginary symmetry axis described in the aforementioned first and second embodiments are merely illustrative, and the present invention is not limited to these.

Figure 16:
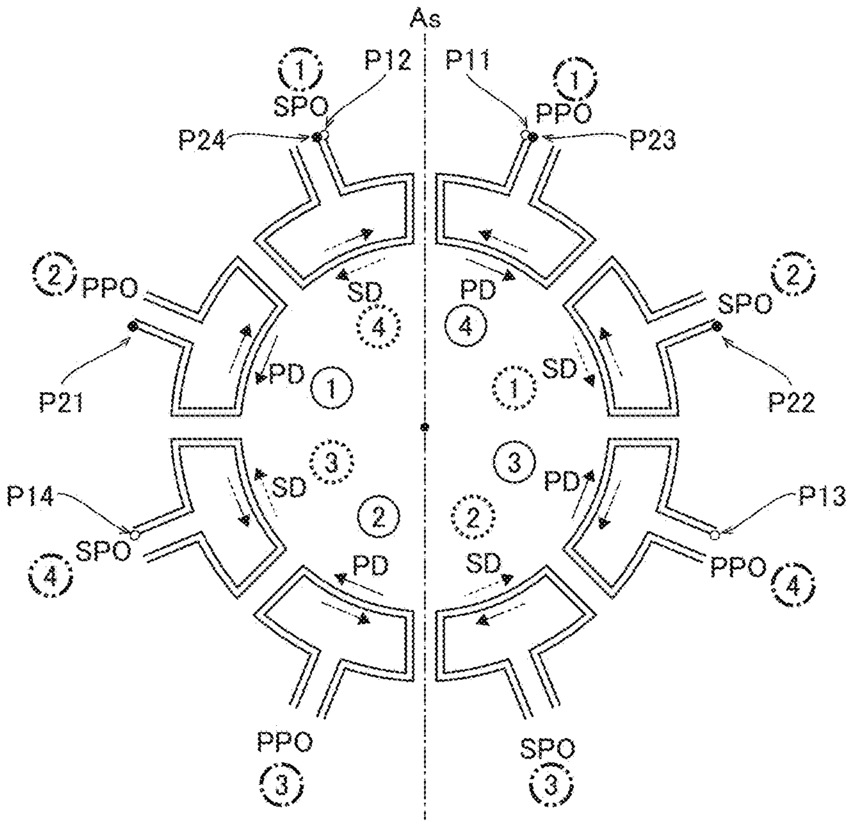
FIG. 16 is a plan view illustrating functions of electrodes, directions of currents, and orders of connection of the electrodes of the vibrating gyro element before switching in a first modified embodiment of the first embodiment.
Figure 17:
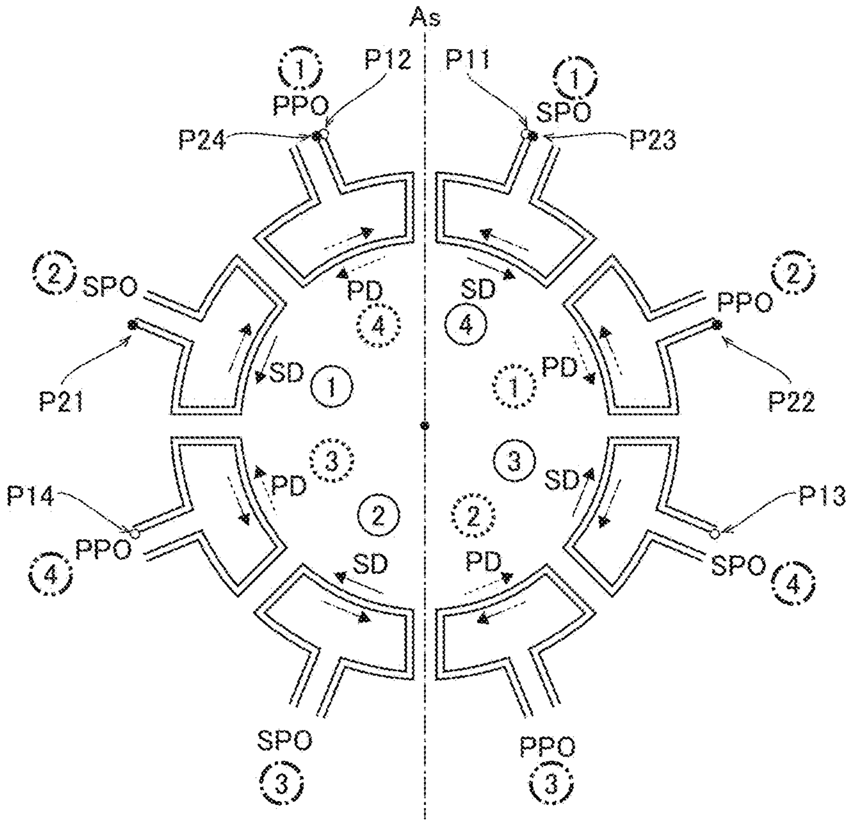
FIG. 17 is a plan view illustrating functions of the electrodes, directions of currents, and orders of connection of the electrodes of the vibrating gyro element after the switching in the first modified embodiment of the first embodiment.

For example, in a first modified embodiment of the aforementioned first embodiment shown in FIGS. 16 and 17, the electrodes 40*b*, 40*d*, 40*f* and 40*h* are electrically connected in series to each other so that a current flows in this order. Also, the electrodes 40*a*, 40*g*, 40*e* and 40*c* are electrically connected in this order in series to each other so that a current flows in this order. Also, the electrodes 40*l*, 40*n*, 40*p* and 40*j* are electrically connected in this order in series to each other so that the current flows in this order. Also, the electrodes 40*o*, 40*m*, 40*k* and 40*i* are electrically connected in this order in series to each other so that a current flows in this order. Also, in comparison between a pair of the electrodes 40 that have the same function and the same potential before and after the switching, with respect to a reference direction of the current of each of the paired electrodes 40, which have the same function and the same potential before and after the switching, functions, directions of currents, and orders of electrical connection in each of the functions of the periphery electrodes 40 that are arranged on a periphery of one of the paired electrodes are identical to the periphery electrodes that are arranged on a periphery of another of the paired electrodes. Also, the imaginary symmetry axis As passes through the center of the vibrator 20, the center between the electrodes 40*a* and 40*b* (between the electrodes 40*i* and 40*j*), and the center between the electrodes 40*e* and 40*f* (between the electrodes 40*m* and 40*n*), and extends in the radial direction. Here, also in the first modified embodiment of the aforementioned first embodiment, since the aforementioned conditions are satisfied, it is possible to sufficiently cancel an effect of a magnetic field caused by a displacement current in a switching configuration; and since directions of the currents and orders of electrical connection in each of functions of pairs of electrodes 40 that switch with each other are reflection symmetric with respect to the imaginary symmetry axis As, it is possible to realize a structure that brings potential differences between the electrodes 40 before and after the switching equal to each other by using a simple structure.

Figure 18:
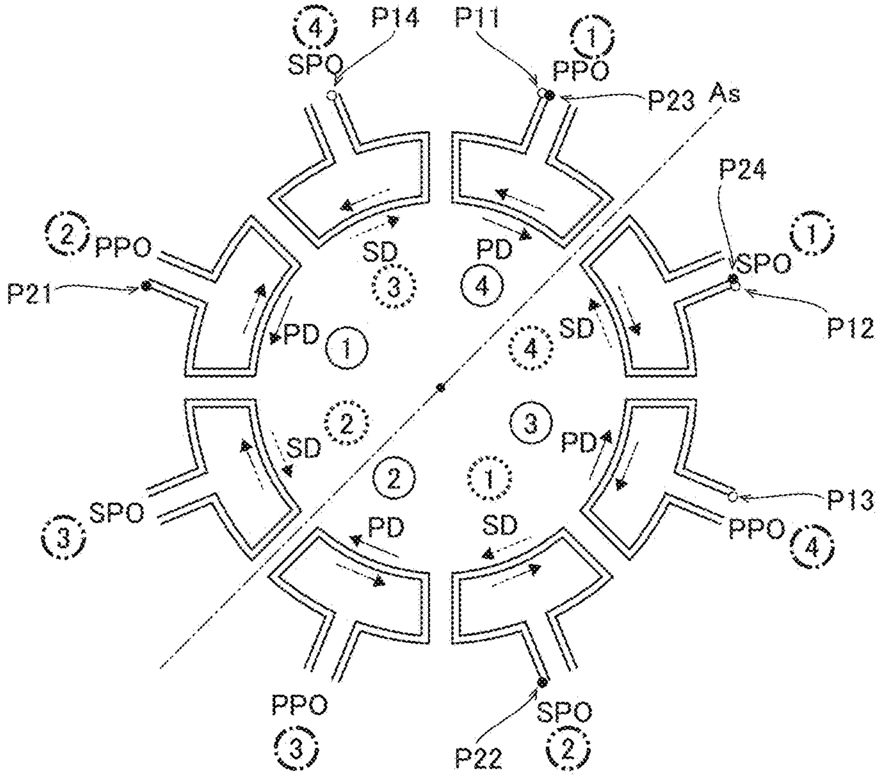
FIG. 18 is a plan view illustrating functions of electrodes, directions of currents, and orders of connection of the electrodes of the vibrating gyro element before switching in a second modified embodiment of the first embodiment.
Figure 19:
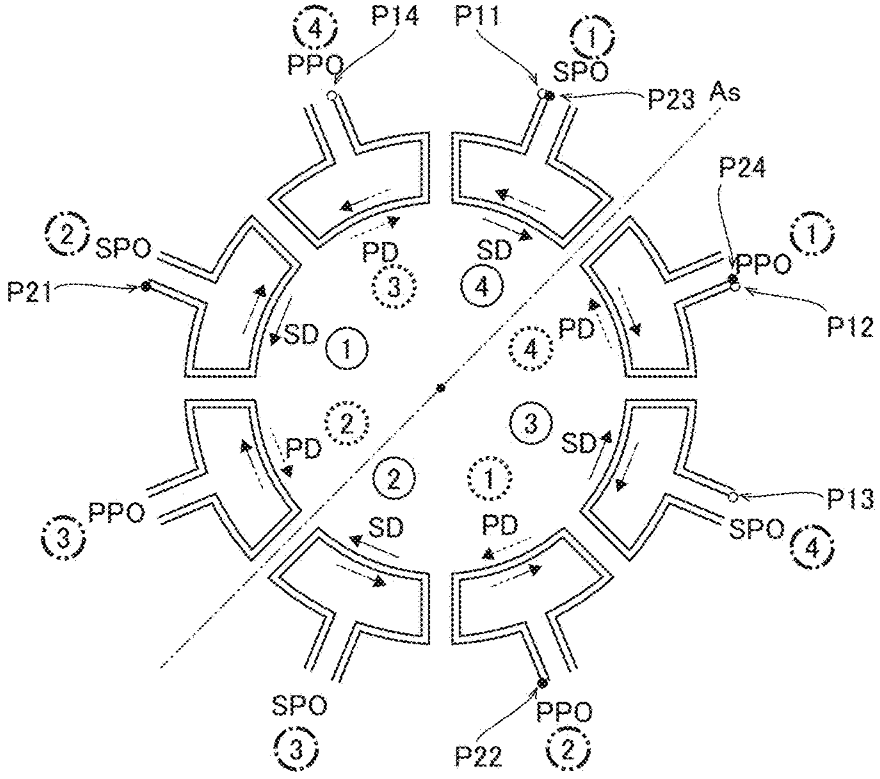
FIG. 19 is a plan view illustrating functions of the electrodes, directions of currents, and orders of connection of the electrodes of the vibrating gyro element after the switching in the second modified embodiment of the first embodiment.

Also, for example, in a second modified embodiment of the aforementioned first embodiment shown in FIGS. 18 and 19, the electrodes 40*b*, 40*d*, 40*f* and 40*h* are electrically connected in series to each other so that a current flows in this order. Also, the electrodes 40*c*, 40*a*, 40*g* and 40*e* are electrically connected in this order in series to each other so that a current flows in this order. Also, the electrodes 40*l*, 40*n*, 40*p* and 40*j* are electrically connected in this order in series to each other so that a current flows in this order. Also, the electrodes 40*i*, 40*o*, 40*m* and 40*k* are electrically connected in this order in series to each other so that a current flows in this order. Also, in comparison between a pair of the electrodes 40 that have the same function and the same potential before and after the switching, with respect to a reference direction of the current of each of the paired electrodes 40, which have the same function and the same potential before and after the switching, functions, directions of currents, and orders of electrical connection in each of the functions of the periphery electrodes 40 that are arranged on a periphery of one of the paired electrodes are identical to the periphery electrodes that are arranged on a periphery of another of the paired electrodes. Also, the imaginary symmetry axis As passes through the center of the vibrator 20, the center between the electrodes 40*b* and 40*c* (between the electrodes 40*j* and 40*k*), and the center between the electrodes 40*f* and 40*g* (between the electrodes 40*n* and 40*o*), and extends in the radial direction. Here, also in the second modified embodiment of the aforementioned first embodiment, since the aforementioned conditions are satisfied, it is possible to sufficiently cancel an effect of a magnetic field caused by a displacement current in a switching configuration; and since directions of the currents and orders of electrical connection in each of functions of pairs of electrodes 40 that switch with each other are reflection symmetric with respect to the imaginary symmetry axis As, it is possible to realize a structure that brings potential differences between the electrodes 40 before and after the switching equal to each other by using a simple structure.

Figure 20:
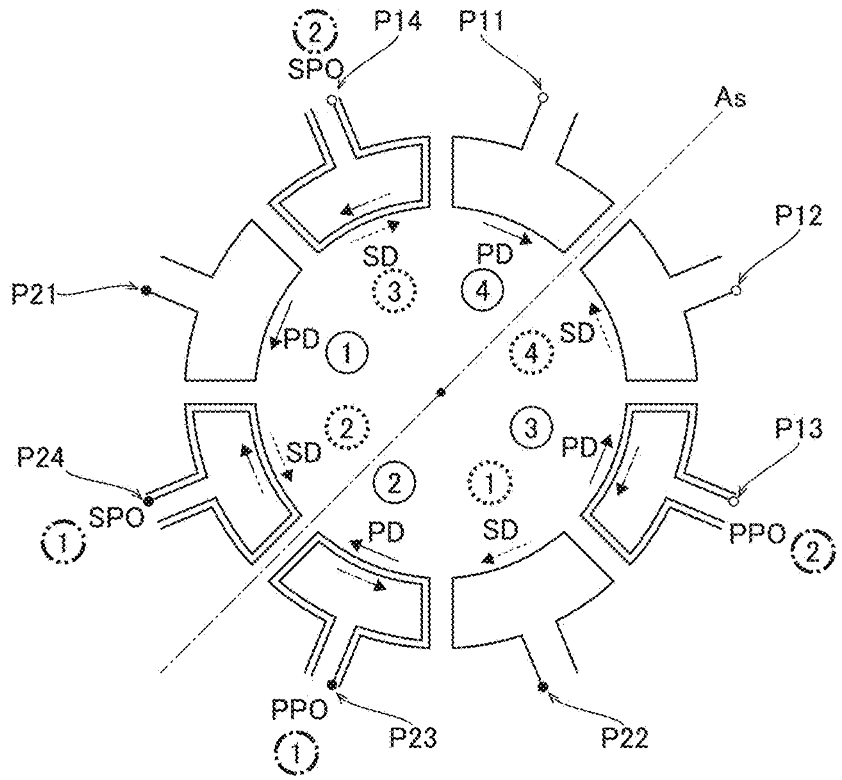
FIG. 20 is a plan view illustrating functions of electrodes, directions of currents, and orders of connection of the electrodes of the vibrating gyro element before switching in a third modified embodiment of the first embodiment.
Figure 21:
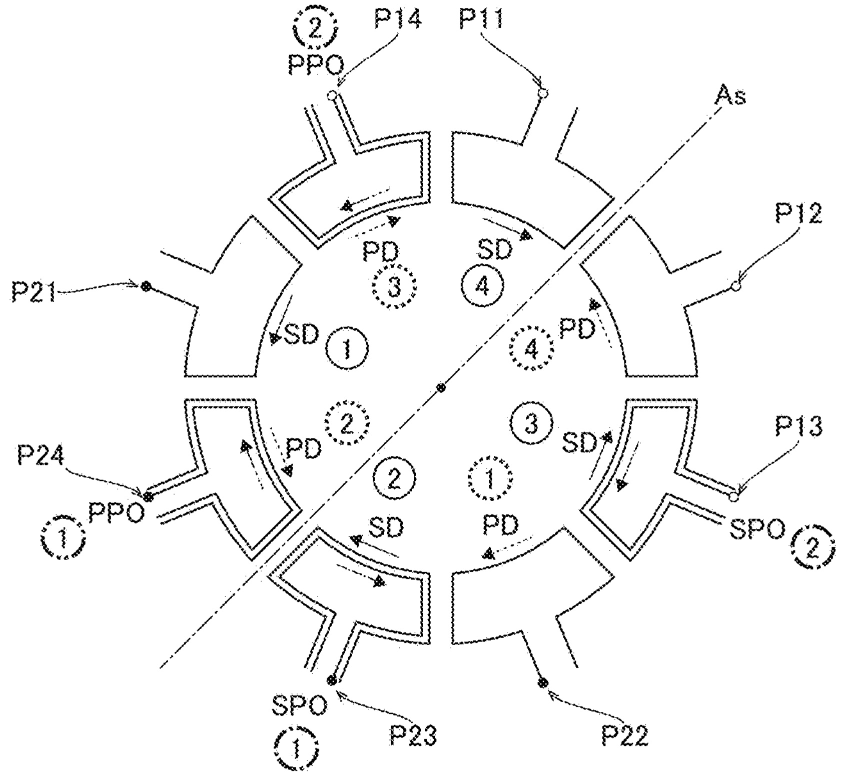
FIG. 21 is a plan view illustrating functions of the electrodes, directions of currents, and orders of connection of the electrodes of the vibrating gyro element after the switching in the third modified embodiment of the first embodiment.

Also, for example, in a third modified embodiment of the aforementioned first embodiment shown in FIGS. 20 and 21, two primary detection electrodes PPO and two secondary detection electrodes SPO are arranged to skip some of the positions. Even in this arrangement, it is possible to sufficiently cancel an effect of a magnetic field caused by a displacement current as long as the aforementioned conditions are satisfied. Although the primary detection electrodes PPO and the secondary detection electrodes SPO are arranged to skip some of the positions in the third modified embodiment of the aforementioned first embodiment, the primary drive electrodes PD and the secondary drive electrodes SD, and the primary detection electrodes PPO and the secondary detection electrodes SPO may be arranged to skip some of the positions. Although the positions skipped by the electrodes 40 are not limited to the positions shown in FIGS. 20 and 21, the positions skipped by the electrodes 40 become reflection symmetric with respect to the imaginary symmetry axis As in a case in which the imaginary symmetry axis As is defined.

In a third modified embodiment of the aforementioned first embodiment, the electrodes 40*b*, 40*d*, 40*f* and 40*h* are electrically connected in series to each other so that a current flows in this order. Also, the electrodes 40*c*, 40*a*, 40*g* and 40*e* are electrically connected in this order in series to each other so that a current flows in this order. Also, the electrodes 40*l* and 40*n* are electrically connected in this order in series to each other so that a current flows in this order. Also, the electrodes 40*i* and 40*o* are electrically connected in this order in series to each other so that a current flows in this order. Also, in comparison between a pair of the electrodes 40 that have the same function and the same potential before and after the switching, with respect to a reference direction of the current of each of the paired electrodes 40, which have the same function and the same potential before and after the switching, functions, directions of currents, and orders of electrical connection in each of the functions of the periphery electrodes 40 that are arranged on a periphery of one of the paired electrodes are identical to the periphery electrodes that are arranged on a periphery of another of the paired electrodes. Also, the imaginary symmetry axis As passes through the center of the vibrator 20, the center between the electrodes 40*b* and 40*c*, and the center between the electrodes 40*f* and 40*g* (between the electrodes 40*n* and 40*o*), and extends in the radial direction. Here, also in the third modified embodiment of the aforementioned first embodiment, since the aforementioned conditions are satisfied, it is possible to sufficiently cancel an effect of a magnetic field caused by a displacement current in a switching configuration; and since directions of the currents and orders of electrical connection in each of functions of pairs of electrodes 40 that switch with each other are reflection symmetric with respect to the imaginary symmetry axis As, it is possible to realize a structure that brings potential differences between the electrodes 40 before and after the switching equal to each other by using a simple structure.

Figure 22:
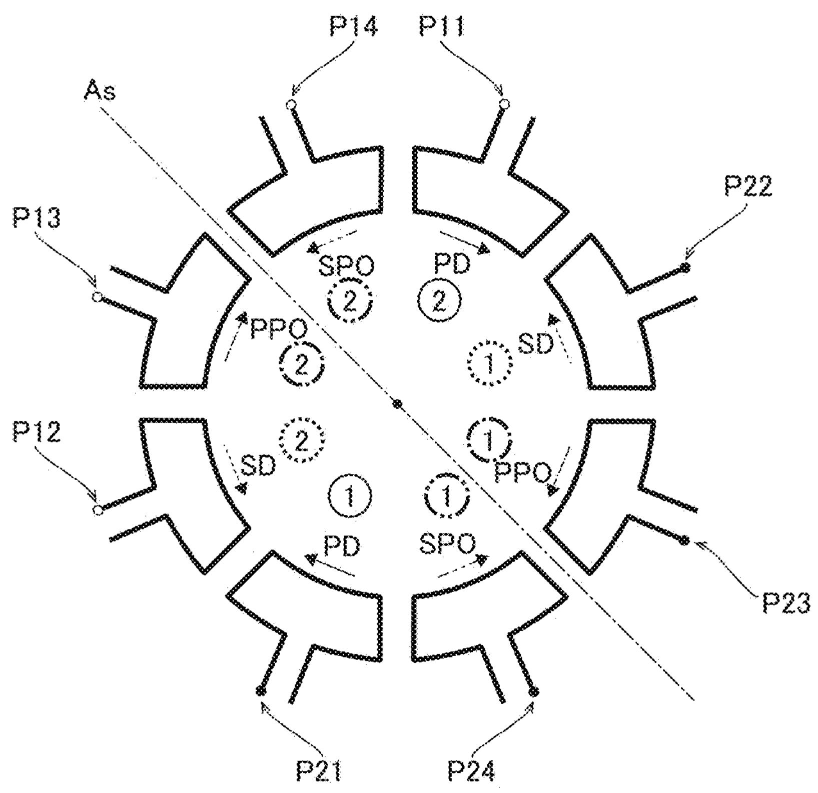
FIG. 22 is a plan view illustrating functions of electrodes, directions of currents, and orders of connection of the electrodes of the vibrating gyro element before switching in a first modified embodiment of the second embodiment.
Figure 23:
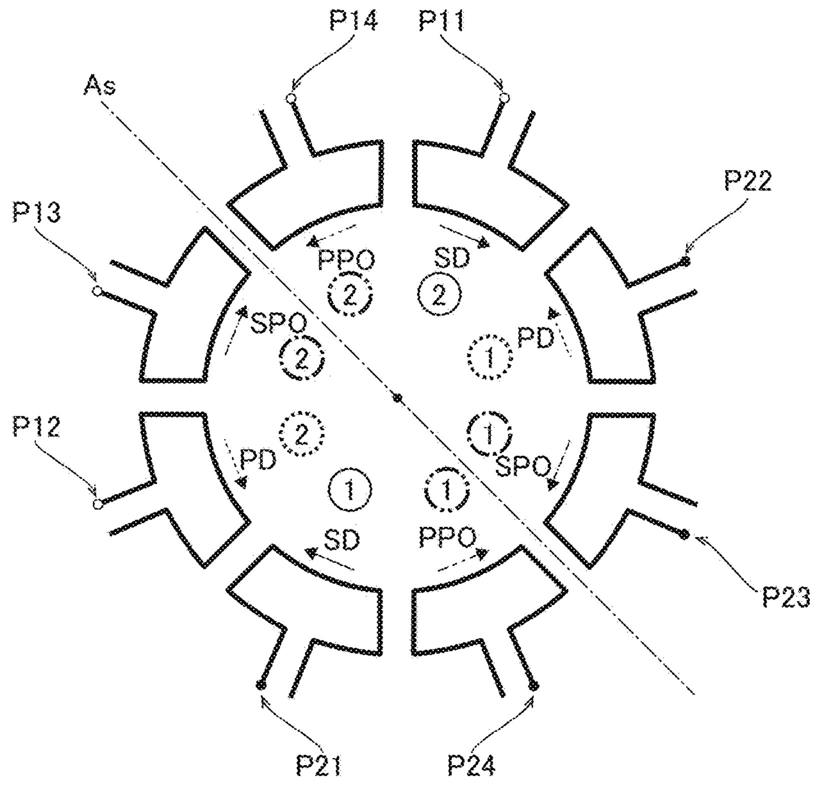
FIG. 23 is a plan view illustrating functions of the electrodes, directions of currents, and orders of connection of the electrodes of the vibrating gyro element after the switching in the first modified embodiment of the second embodiment.

Also, for example, in a first modified embodiment of the aforementioned second embodiment shown in FIGS. 22 and 23, the electrodes 40*b* and 40*f* are electrically connected in series to each other so that a current flows in this order. Also, the electrodes 40*g* and 40*c* are electrically connected in this order in series to each other so that a current flows in this order. Also, the electrodes 40*h* and 40*d* are electrically connected in this order in series to each other so that a current flows in this order. Also, the electrodes 40*a* and 40*e* are electrically connected in this order in series to each other so that a current flows in this order. Also, in comparison between a pair of the electrodes 40 that have the same function and the same potential before and after the switching, with respect to a reference direction of the current of each of the paired electrodes 40, which have the same function and the same potential before and after the switching, functions, directions of currents, and orders of electrical connection in each of the functions of the periphery electrodes 40 that are arranged on a periphery of one of the paired electrodes are identical to the periphery electrodes that are arranged on a periphery of another of the paired electrodes. Also, the imaginary symmetry axis As passes through the center of the vibrator 20, the center between the electrodes 40*a* and 40*h*, and the center between the electrodes 40*d* and 40*e*, and extends in the radial direction. Here, also in the first modified embodiment of the aforementioned second embodiment, since the aforementioned conditions are satisfied, it is possible to sufficiently cancel an effect of a magnetic field caused by a displacement current in a switching configuration; and since directions of the currents and orders of electrical connection in each of functions of pairs of electrodes 40 that switch with each other are reflection symmetric with respect to the imaginary symmetry axis As, it is possible to realize a structure that brings potential differences between the electrodes 40 before and after the switching equal to each other by using a simple structure.

Figure 24:
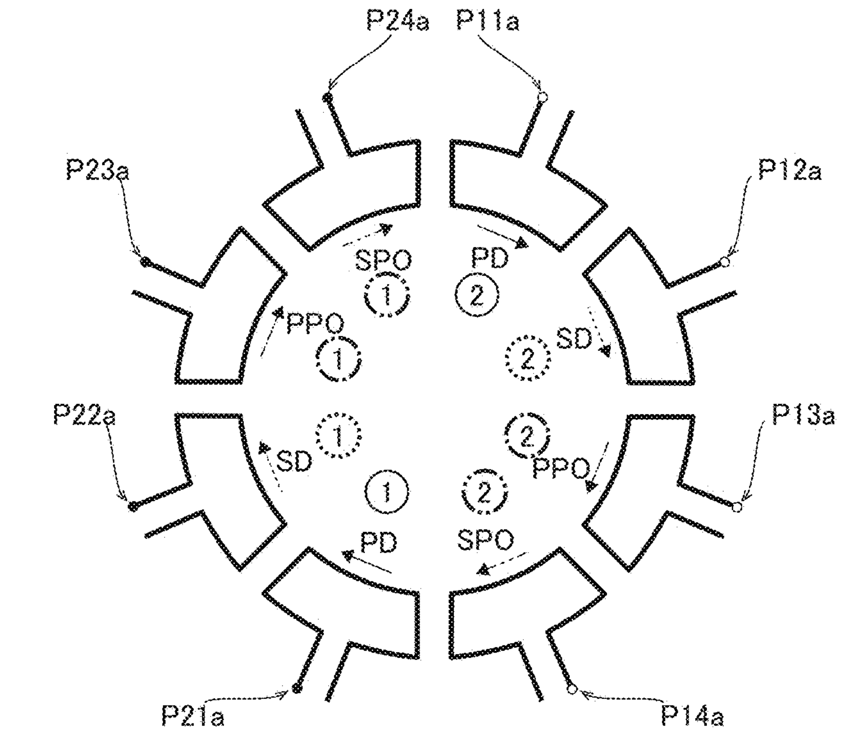
FIG. 24 is a plan view illustrating functions of electrodes, directions of currents, and orders of connection of the electrodes of the vibrating gyro element before switching in a second modified embodiment of the second embodiment.
Figure 25:
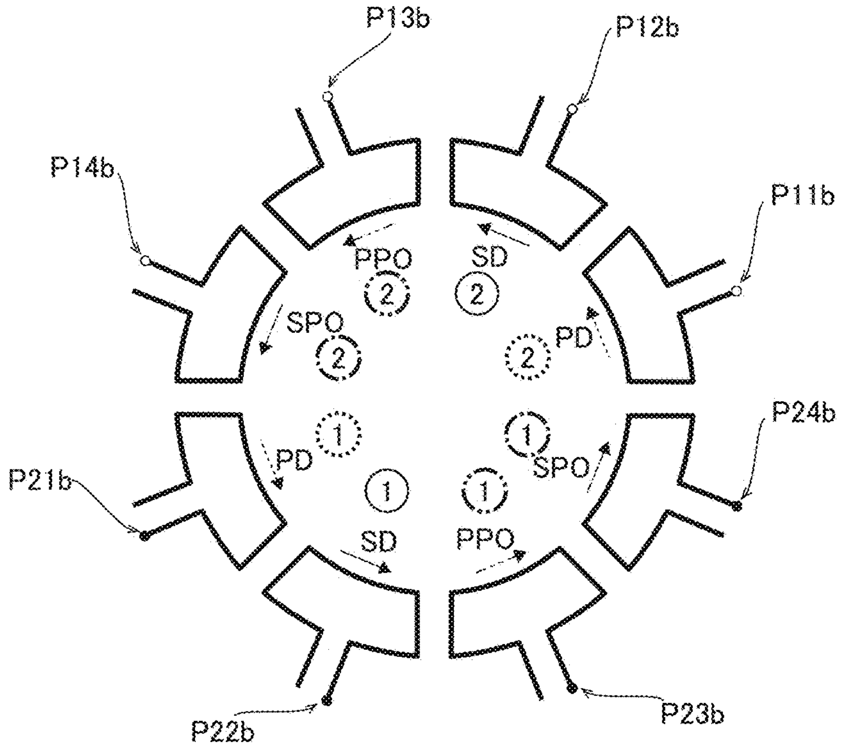
FIG. 25 is a plan view illustrating functions of the electrodes, directions of currents, and orders of connection of the electrodes of the vibrating gyro element after the switching in the second modified embodiment of the second embodiment.

While the example in which the imaginary symmetry axis is defined has been shown in the aforementioned first embodiment, the first to third modified embodiments of the aforementioned first embodiment, the aforementioned second embodiment, and the first modified embodiment of the aforementioned second embodiment, the present invention is not limited to this. For example, although the imaginary symmetry axis As is not defined in the second modified embodiment of the aforementioned second embodiment shown in FIGS. 24 and 25, the aforementioned conditions are satisfied. For example, in a case in which the primary drive electrode PD of 2 is watched with interest, before the switching, the secondary drive electrodes SD of 2 through which a common directional current, which flows in a direction common to the current of the electrode of interest, flows exists in a part on an outgoing side in a direction of the current of the primary drive electrode PD of 2; and the secondary detection electrode SPO of 1 through which a common directional current exists in a part on an incoming side in a direction of the current of the primary drive electrode PD of 2. Also, after the switching, the secondary drive electrodes SD of 2 through which a common directional current, which flows in a direction common to a current of the electrode of interest, flows still exists in a part on the outgoing side in a direction of the current of the primary drive electrode PD of 2; and the secondary detection electrode SPO of 2 through which a common directional current still exists in a part on the incoming side in the direction of the current of the primary drive electrode PD of 1. Accordingly, the primary drive electrode PD of 2 satisfies the aforementioned conditions. Although the primary drive electrode PD of 2 is described, the other primary drive electrodes PD, the secondary drive electrodes SD, the primary detection electrodes PPO, and the secondary detection electrodes SPO also satisfy the aforementioned conditions.

In the second modified embodiment of the aforementioned second embodiment, the aforementioned conditions is satisfied by changing inflow points of currents, outflow points of the currents, directions of the currents, and orders of electrical connection of each of the electrodes 40 between before and after the switching. The changing can be realized by providing a structure including switches.

In the second modified embodiment of the aforementioned second embodiment, current flow points P11*a* to P14*a* before the switching are changed to current flow points P11*b* to P14*b* after the switching. Also, current outflow points P21*a* to P24*a* before the switching are changed to current inflow points P21*b* to P24*b* after the switching. Also, directions of the currents of the electrodes 40*a* to 40*h* before the switching, which are clockwise, are changed to counterclockwise as directions of the currents of the electrodes 40*a* to 40*h* after the switching. On the one hand, before the switching, the electrodes 40*b* and 40*f* are electrically connected in series to each other in this order; the electrodes 40*c* and 40*g* are electrically connected in series to each other in this order; the electrodes 40*d* and 40*h* are electrically connected in series to each other in this order; and the electrodes 40*e* and 40*a* are electrically connected in series to each other in this order. On the other hand, after the switching, orders of electrical connection are changed to electrically connect the electrodes 40*h* and 40*d* in series to each other in this order, and to electrically connect the electrodes 40*a* and 40*e* in series to each other in this order. In the second modified embodiment of the aforementioned second embodiment, the aforementioned conditions are satisfied by changing current paths as described above. Accordingly, in the second modified embodiment of the aforementioned second embodiment, it is also possible to sufficiently cancel an effect of a magnetic field caused by a displacement current.

In the configuration of the aforementioned first embodiment, the aforementioned conditions may be satisfied by changing inflow points of currents, outflow points of the currents, directions of the currents, and orders of electrical connection of the electrodes between before and after the switching.

While the example in which the primary vibration of a cos 2θ mode is excited in the vibrator has been shown in the aforementioned first and second embodiments, the present invention is not limited to this. For example, primary vibration of a cos Nθ mode (N is a natural number not smaller than 3) may be excited in the vibrator. In this case, the supports and the electrodes are arranged in 4N bearing directions spaced at a constant angular interval in the circumferential direction of the vibrator.

While the example in which the vibrator has a circular shape has been shown in the aforementioned first and second embodiments, the present invention is not limited to this. For example, the vibrator may have a ring shape such as a regular-polygonal ring shape. Also, the vibrator may have a disk shape, a hemispherical shape, or the like. In a case in which the vibrator has a hemispherical shape, the electrodes on the vibrator are arranged a curved surface or on a flat bottom surface of the hemispherical shape.

Also, a shape of the support shown in the aforementioned first and second embodiments is merely illustrative, the present invention is not limited to this.

While the example in which the primary drive electrode switch with the secondary drive electrode, and the primary detection electrode switch with the secondary detection electrode has been shown in the aforementioned first and second embodiments, the present invention is not limited to this. For example, the primary drive electrode may switch with the secondary detection electrode, and the primary detection electrode may switch with the secondary drive electrode. In a case in which the imaginary symmetry axis is defined, the imaginary symmetry axis is required to extend between each pair of the electrodes that switch with each other (the primary drive electrode and the secondary detection electrode, or the primary detection electrode and the secondary drive electrode).

While the example in which the electrodes in each of functions of the primary drive electrodes, the primary detection electrodes, the secondary detection electrodes, and the secondary drive electrodes are electrically connected in a clockwise or counterclockwise order has been shown in the aforementioned first embodiment, the present invention is not limited to this. The electrodes in each of functions of the primary drive electrodes, the primary detection electrodes, the secondary detection electrodes, and the secondary drive electrodes may be electrically connected in an order other than the clockwise or counterclockwise order such as an order of electrical connection in a spatial arrangement in which the four primary drive electrodes are in the order of 4-2-1-3 in a clockwise direction. Also, while the example in which all of the electrodes in each function are connected in series to each other has been shown, some of the electrodes in each function may be connected in parallel to other of the electrodes. Also, some of the electrodes in one function may be not be connected to other of the electrodes in the same one function and be independently connected.

While the example in which currents flow through two electrodes that are connected in parallel to each other in opposite directions has been shown in the aforementioned first embodiment, the present invention is not limited to this. For example, currents may flow through two electrodes that are connected in parallel to each other in a common direction.

While the example in which two electrodes that are connected in parallel to each other are arranged in each of the support and the vibrator has been shown in the aforementioned first embodiment, the present invention is not limited to this. For example, three electrodes that are connected in parallel to each other may be arranged in each of the support and the vibrator. That is, three or more lines of electrodes may be arranged. Also, the supports may include a dummy on which no electrode is arranged.

Also, a shape of the stationary part shown in the aforementioned first and second embodiments is merely illustrative, the present invention is not limited to this. The shape of the stationary part is not limited to a square, and a center of the stationary part does not necessarily agree with the center of the vibrator. Also, angles of the supports, an angle of the stationary part, and angles of the electrodes on the vibrators with reference to the center of the vibrator are not limited.

DESCRIPTION OF REFERENCE NUMERALS

10; stationary part
20; vibrator
30; support
40, 40*a* to 40*p*; electrode
60; magnetic field applier
100, 200; vibrating gyro element
101; gyroscope
150; calculator
As; imaginary symmetry axis
PD; primary drive electrode
SD; secondary drive electrode
PPO; primary detection electrode
SPO; secondary detection electrode

The invention claimed is:

1. An electromagnetically driven vibrating gyro element comprising:
- a stationary part;
- a vibrator;
- a support connecting the vibrator to the stationary part for supporting the vibrator to allow the vibrator to vibrate;
- a plurality of electrodes arranged on a surface of the vibrator to be spaced at an interval away from each other in a circumferential direction of the vibrator and to form a line(s); and
- a magnetic field applier for applying a magnetic field to the electrodes, wherein
- the vibrator has a vibration mode of cos Nθ (where N is a natural number not smaller than 2),
- the electrodes include
  - a primary drive electrode for exciting the vibrator to primary vibration,
  - a primary detection electrode for detecting the primary vibration,
  - a secondary detection electrode for detecting secondary vibration of the vibrator, and
  - a secondary drive electrode for driving the vibrator to counteract the secondary vibration,
- the primary drive electrode is configured to be able to switch with one of the secondary drive electrode and the secondary detection electrode, and the primary detection electrode is configured to be able to switch with another of the secondary drive electrode and the secondary detection electrode, and
- electrical connection in each of the primary drive electrode, the primary detection electrode, the secondary detection electrode and the secondary drive electrode is set to make, with respect to a position and a direction of a current of the electrode of interest to be switched as reference, potential differences between the electrode of interest, and the electrodes that are arranged on a periphery of the electrode of interest unchanged before and after the switching.

2. The vibrating gyro element according to claim 1, wherein the electrical connection in each of the primary drive electrode, the primary detection electrode, the secondary detection electrode and the secondary drive electrode is set to satisfy conditions, with respect to the position and the direction of the current of the electrode of interest to be switched as the reference, that the positions and functions of the periphery electrodes, which are arranged on the periphery of the electrode of interest, before and after the switching are identical to each other, that the positions and the directions of currents of the periphery electrodes before and after the switching are identical to each other, and that the positions and orders of electrical connection in the functions of the periphery electrodes before and after the switching are identical to each other.

3. The vibrating gyro element according to claim 2, wherein the positions of the electrodes on the surface of the vibrator, the directions of the currents of the electrodes, and the orders of electrical connection in each of functions of the electrodes in the primary drive electrode, the primary detection electrode, the secondary detection electrode and the secondary drive electrode are set to make the positions of pairs of the electrodes that are set to switch with each other on the surface of the vibrator, the directions of currents of the pairs of the electrodes, which are set to switch with each other, and the orders of electrical connection in each of functions of the pairs of the electrodes, which are set to switch with each other, reflection symmetric with respect to an imaginary symmetry axis that passes through a center of the vibrator and extends in a radial direction of the vibrator.

4. The vibrating gyro element according to claim 3, wherein a plurality of lines each of which includes the electrodes are arranged on the surface of the vibrator to extend side by side and to be spaced at an interval away from each other in the circumferential direction of the vibrator.

5. The vibrating gyro element according to claim 4, wherein
- the primary drive electrode and one of the secondary detection electrode and the secondary drive electrode are alternately arranged in a common line; and
- the primary detection electrodes and another of the secondary detection electrode and the secondary drive electrode are alternately arranged in a common line.

6. The vibrating gyro element according to claim 1, wherein the electrodes in each of functions of the primary drive electrode, the primary detection electrode, the secondary detection electrode, and the secondary drive electrode are electrically connected in a clockwise or counterclockwise order.

7. A gyroscope comprising:
- an electromagnetically driven vibrating gyro element; and
- a calculator for calculating an angular velocity based on an output signal from the vibrating gyro element, wherein the vibrating gyro element includes a stationary part, a vibrator, a support connecting the vibrator to the stationary part for supporting the vibrator to allow the vibrator to vibrate, a plurality of electrodes arranged on a surface of the vibrator to be spaced at an interval away from each other in a circumferential direction of the vibrator and to form a line(s), and a magnetic field applier for applying a magnetic field to the electrodes, the vibrator has a vibration mode of cos Nθ (where N is a natural number not smaller than 2), the electrodes include a primary drive electrode for exciting the vibrator to primary vibration, a primary detection electrode for detecting the primary vibration, a secondary detection electrode for detecting secondary vibration of the vibrator, and a secondary drive electrode for driving the vibrator to counteract the secondary vibration, the primary drive electrode is configured to be able to switch with one of the secondary drive electrode and the secondary detection electrode, and the primary detection electrode is configured to be able to switch with another of the secondary drive electrode and the secondary detection electrode, and electrical connection in each of the primary drive electrode, the primary detection electrode, the secondary detection electrode and the secondary drive electrode is set to make, with respect to a position and a direction of a current of the electrode of interest to be switched as reference, potential differences between the electrode of interest, and the electrodes that are arranged on a periphery of the electrode of interest unchanged before and after the switching.

* * * * *